United States Patent
Ito et al.

(10) Patent No.: US 7,345,787 B2
(45) Date of Patent: Mar. 18, 2008

(54) ACCURACY OF COLOR CONVERSION PROFILE

(75) Inventors: Takashi Ito, Nagano (JP); Yoshifumi Arai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 843 days.

(21) Appl. No.: 10/826,860

(22) Filed: Apr. 15, 2004

(65) Prior Publication Data
US 2004/0263882 A1    Dec. 30, 2004

(30) Foreign Application Priority Data
Apr. 18, 2003    (JP) .............................. 2003-114421

(51) Int. Cl.
*H04N 1/60*    (2006.01)
*G06K 9/00*    (2006.01)

(52) U.S. Cl. ........................ 358/1.9; 358/518; 358/523; 358/520; 358/2.1; 382/167; 382/162; 382/166; 382/164; 345/604; 345/600; 345/589; 345/603

(58) Field of Classification Search ................. 358/1.9, 358/2.1, 518, 523, 519, 520, 530, 515; 345/600, 345/603, 604, 606, 589; 382/167, 162, 164, 382/166; 399/28, 39
See application file for complete search history.

(56) References Cited
U.S. PATENT DOCUMENTS

| | | | | |
|---|---|---|---|---|
| 5,504,821 A | * | 4/1996 | Kanamori et al. | .......... 382/167 |
| 6,128,407 A | * | 10/2000 | Inoue et al. | ................ 382/167 |
| 6,335,734 B1 | * | 1/2002 | Nagae et al. | ............... 345/589 |

* cited by examiner

Primary Examiner—King Y. Poon
Assistant Examiner—S. Kau
(74) Attorney, Agent, or Firm—Martine Penilla & Gencarella, LLP

(57) ABSTRACT

A method for determining lattice points to be referenced to prepare the correspondence defining data, said method including steps of prescribing a smoothness evaluation function which has a function form differing depending on each region in the color gamut to which the lattice point to be evaluated belongs and also contains a constraint condition that the closer the lattice point is to the boundary of the region of the color gamut, the more the evaluated value decreases as the result of its movement, optimizing the arrangement of lattice points in the device-independent color space by improving the rating of the smoothness evaluation function, with the lattice point position information in the low-dimensional color space varied, and determining lattice points to be referenced to prepare the correspondence defining data in the optimized state.

11 Claims, 11 Drawing Sheets

ACCURACY OF COLOR CONVERSION PROFILE

BACKGROUND OF THE INVENTION

1. Field of the Invention

The present invention relates to a technique for improving the accuracy of color conversion profile used for printing.

2. Description of the Related Art

The image output devices such as displays and printers usually employ the color image data which expresses in tone the color of each pixel in term of specific color components. The image data specify colors by means of any of color spaces, such as RGB color space that uses three colors of R (red), G (green), and B (blue), and CMY color space that uses C (cyan), M (magenta), and Y (yellow), including lc (light cyan), lm (light magenta), DY (dark yellow), and K (black). These colors are usually device-dependent colors inherent in individual image output devices. One way to permit various image output devices to produce identical colors is by using a color-correcting LUT (look-up table) that specifies correspondence between colors for one device and colors for another device.

The color-correcting LUT should specify the correspondence for all the colors that can be produced by any image output device; however, this is impractical from the standpoint of memory capacity and work require to prepare each color-correcting LUT. It is common practice to specify the correspondence for typical colors in a specific number and calculate the correspondence for any other arbitrary colors by interpolation. In other words, common practice is not to perform colorimetry on a very large number of colors but to cause the image output device to produce colors (to an extent for practical colorimetry) and perform colorimetry on these colors, thereby specifying the color-correcting LUT for typical colors in a specific number.

Before preparing the color-correcting LUT, it is necessary to determine the colors in a specific number on which colorimetry is performed or to determine a plurality of lattice points in the color space. One conventional way to determine lattice points is by color separation. The procedure for color separation consists of prescribing cubic lattice points in the CMY space and transforming three colors of CMY at each lattice point into six colors of CMYKlclm according to a special transforming rule, thereby determining lattice points with components of ink colors.

The above-mentioned conventional method for determining lattice points is unable to sufficiently improve the accuracy of color conversion in the color-correcting LUT to be prepared eventually. In other words, the correspondence between CMY and ink color components, which is determined by color separation as mentioned above, conforms to the rule of transformation; however, the arrangement of lattice points may be distorted after color separation because no consideration is given to the smoothness of the arrangement of lattice points in the color space. If color transformation is carried out by referencing the distorted arrangement of lattice points, there occur some portions with locally poor accuracy at the time of interpolation. Particularly, this is an instance where sufficient smoothing is not achieved when R ink or V (violet) ink is used. Consequently, there has been a demand for a method of determining lattice points which permits sufficient smoothing in such a way that the degree of smoothness of the arrangement of lattice points does not become aggravated locally in the color gamut.

SUMMARY OF THE INVENTION

The present invention was completed in view of the foregoing. It is an object of the present invention to provide a procedure for selecting optimal lattice points by adjusting the arrangement of lattice points highly freely and also sufficiently smoothing over the entire color gamut.

According to the present invention, the above-mentioned object is achieved by specifying an evaluation function which evaluates the degree of smoothness of the arrangement of lattice points in the device-independent color space and has as its variable the lattice point position information of the low-dimensional color space. The smoothness evaluation function varies in its form depending on the region in the color gamut to which the lattice points to be evaluated belong. It contains a constraint condition that the value of evaluation decreases as the lattice points move, with the extent of decrease being greater according as the lattice points are closer to the boundary of that region of the color gamut. The arrangement of lattice points is optimized by improving the value of the evaluation function. In other words, the lattice points to be evaluated are the lattice points to be optimized, and variation of the lattice point position information moves the lattice points in the device-independent color space. In this way it is possible to evaluate smoothness of the arrangement of lattice points in the device-independent color space.

Also, the variable to be varied is the lattice point position information of the low-dimensional color space, and the lattice point to be optimized exists in the device-independent color space. Therefore, when the arrangement of lattice points is smoothed and optimized, the ink amount defined by the original correspondence defining data is not directly varied, and when the variable is adjusted, it is not restricted by the above-mentioned rule of color separation. In other words, it updates the lattice point position information and then calculates the ink amount corresponding to the lattice points specified by the lattice point position information and associates it with the lattice point in the low-dimensional color space prescribed by the original correspondence defining data; but when the ink amount is calculated, it does not change directly the ink amount itself prescribed by the original correspondence defining data.

On the other hand, the position of lattice points to be optimized may or may not be moved freely. Consequently, the smoothness evaluation function may take on varied forms according to the position of the lattice points to be optimized, so that it moves the lattice points adequately in response to the degree of freedom of each position. Moreover, if smoothness of the arrangement of lattices points to be optimized by different functions is neglected when the lattice points are optimized by the function form varying for each region in the color gamut, there is the possibility that smoothness of the arrangement of lattice points present at the different position in the above-mentioned region of the color gamut decreases. However, in the present invention, it contains a restraint condition that the value of evaluation decreases as the lattice points move, with the extent of decrease being greater according as the lattice points are closer to the boundary of the region of the color gamut. Therefore, those lattice points close to the boundary of the region of the color gamut are hard to move. For this reason, it is possible to prevent lattice points from moving individually and freely from one region of the color gamut to another, and to prevent smoothness decreasing at the boundary.

Therefore, the foregoing makes it possible to change highly freely the lattice point position information of the low-dimensional color space and the lattice point in the device-independent color space without decreasing the degree of smoothness even at the boundary of the region of the color gamut and without being greatly affected by the rule of color separation when the lattice point position information in the low-dimensional color space is updated and the lattice point in the device-independent color space is moved. Incidentally, when the arrangement of lattice points is smoothed, the amount of ink specified by the original correspondence defining data is not varied directly; however, consideration is given substantially to the rule of color separation when the arrangement of lattice points is smoothed. In other words, the above-mentioned color separation associates the lattice points in the low-dimensional color space, which are prescribed with less color components than the number of inks for each color, with the lattice points for ink amount in the ink amount space, whose components are the amount of ink for each color. This correspondence is the original correspondence defining data.

When the smoothness evaluating function is determined, the correspondence between the lattice points in the low-dimensional color space and the lattice points in the device-independent color space is acquired by referencing the original correspondence defining data. This makes it possible to determine the smoothness evaluation function to evaluate smoothness of the arrangement of lattice points in the device-independent color space, with its variable being the lattice point position information of the low-dimensional color space. Therefore, the smoothness evaluation function does not vary the amount of ink but reflects the correspondence prescribed by the original correspondence defining data. Therefore, by improving the rating by the smoothness evaluation function, it is possible to satisfy at the same time the smoothing of the arrangement of lattice points in the device-independent color space and the rule of color separation.

The correspondence defining data may be any data that define correspondence between the printing apparatus and the color component value in a color system; for example, it may be an LUT or a so-called profile containing the matrix that prescribes the color relations. The color system mentioned above may be the Lab color space or XYZ color space, which are device independent. (In this specification, the symbol Lab is used for brevity in place of the conventional symbol L*a*b.) It may also include the color space formed by RGB values (used for display) or CMY values. The printing apparatus according to the present invention can use more than three color inks, such as four inks of CMYK or six inks of CMYKlclm or more. The ink combination is not limited to them; a combination of six color inks of CMYKRV is acceptable.

On the other hand, it is only necessary for the original correspondence defining data to prescribe correspondence between the lattice points in a low-dimensional color space that prescribe colors with less color components than the number of inks for each color used by the printing apparatus and the ink amount lattice points in the ink amount space whose components are the amount of inks of each color. The low-dimensional color space may be the RGB color space or the CMY color space, for example. Here, the original correspondence defining data does not need to strictly prescribe correspondence for colors prescribed by each lattice point; therefore, this makes it possible to consider freely the rule of color separation when the original correspondence defining data is previously prepared.

RGB colors and CMY colors are complementary to each other; therefore, when each color is expressed in 256 tones (from 0 to 255), it is possible to assume that C=255−R, M=255−G, and Y=255−B unless a strict agreement among colors is taken into account. Consequently, the RGB color space as the low-dimensional color space is substantially equivalent to the CMY color space as the low-dimensional color space. It is possible to accept various rules to be considered when the original correspondence defining data is previously prepared. One rule may govern how to allocate the combination of CMY colors to CMYKlclm inks at a certain ratio, another rule may limit the amount of inks to be sprayed onto the printing paper, or further another rule may limit the use of K ink to prevent the occurrence of granularity.

The smoothness evaluation function may be acceptable so long as it is capable of evaluating smoothness of the arrangement of lattice points in the device-independent color space and it is also capable of imposing the constraint condition that the arrangement of lattice points becomes nonuniform at a specific position in the device-independent color space. Here, smoothness of arrangement implies the degree to which the line of lattice points is distorted in the color space. For example, distortion is null if the lattice points in the device-independent color space are arranged in cubic lattice, but it is large if lattice points are dislocated from the position of cubic lattice points. It can be said that the degree of smoothness is high if lattice points are arranged uniformly in the device-independent color space. It can also be said that the degree of smoothness is low if a curve is described by a high-order function, said curve being drawn between neighboring lattice points in the device-independent color space and from one boundary to the other in the color gamut formed in the device-independent color space.

In general, if lattice points are regularly arranged in the color space, it is possible to carry out interpolation without appreciable variation in accuracy regardless of local positions in the space when the color at that position is calculated by interpolation. Therefore, by optimizing the position of lattice points according to the present invention, it is possible to improve accuracy of interpolation which is carried out when the correspondence defining data is prepared. In other words, according to the present invention, it is possible to easily determine the lattice points to be referenced to prepare the correspondence defining data on which highly accurate interpolation can be performed.

The smoothness evaluation function should be able to indicate smoothness of the arrangement of lattice points by its value. The rating is improved by making the evaluation value indicating smoothness to approach an ideal value. For example, if the function behaves such that its value decreases as smoothness of the arrangement of lattice points increases, it is possible to optimize the arrangement of lattice points by searching the lattice point position information in the low-dimensional color space that permits the function to takes on a minimal value. In this case the value of the smoothness evaluation function is the evaluation value by itself. This searching may be accomplished in various ways. For example, it is possible to accept various algorithms such as quasi-Newton method and conjugate gradient method.

Moreover, it is not always essential that the smoothness evaluation function contains only a term to evaluate smoothness, for example, a term whose value increases as smoothness decreases; the evaluation function may have terms to describe various conditions in addition to the term to evaluate smoothness. In the present invention, a constraint condition is given which specifies that the evaluation value greatly decreases as lattice points move, with the extent of decrease being greater according as the lattice points are closer to the boundary of the region of the color gamut.

Of course, it is also possible to add another various conditions. The condition may be such that it is not ideal to make the arrangement of lattice points entirely uniform in the color gamut but the state is acceptable in which lattice points are dense in a specific region. Alternatively, it is possible to add a term that allows the state in which the intervals of lattice points are nonuniform. Such construction can be realized by adding a term which decreases the value when lattice points are dense in a specific region or a term which decreases the value when the intervals of lattice points are nonuniform.

It is only necessary to be able to acquire from the original correspondence defining data the correspondence between lattice points in the low-dimensional color space and lattice points in the device-independent color space. It is possible to acquire by various methods the correspondence between the lattice points in the low-dimensional color space (specified by the original correspondence defining data) and the ink amount lattice points. For example, it is possible to acquire the color component values corresponding to lattice points in the device-independent color space by carrying out printing with the amount of ink for each color indicated by ink amount lattice points corresponding to lattice points in the low-dimensional color space and then performing colorimetry on the results of printing.

Also, the original correspondence defining data does not strictly prescribe correspondence between actual colors and it is troublesome to perform printing and colorimetry for all the lattice points of the low-dimensional color space (usually about 1000 points) prescribed by the original correspondence defining data. Therefore, it is permissible to perform operation in a simple manner by using an approximation formula. The approximation formula may be one which is based on physical foundation, and it prescribes correspondence between the lattice points in the low-dimensional color space and the lattice points in the device-independent color space, because the present invention is intended to smooth the arrangement of lattice points in the device-independent color space. The procedure is carried out such that if the lattice points in the device-independent color space obtained by the approximation formula are smoothed, then the actual lattices points are also sufficiently smoothed.

The use of the approximation formula may be exemplified by the combination of colorimetry (to be performed only 16 times or so for each ink in this invention) and operation. To be more specific, patches are printed with each ink in single color in order to reduce the number of colors to be measured, and colorimetry is performed on such patches. The resulting calorimetric values are referenced to calculate the color component value of the device-independent color space by approximation. The approximation formula may be an equality which converts the measured value of ink density into the value of RGB brightness components. This operation gives the correspondence between the amount of ink for each color used for patch printing and the RGB brightness.

In this state a correspondence is established between the amount of ink for each color and the RGB brightness; therefore, it is possible to calculate the RGB brightness corresponding to the combination of individual inks. For example, it is possible to calculate the RGB brightness for the combination of arbitrary ink amounts by the above-mentioned correspondence, if it is assumed that the RGB brightness for the combination of individual inks is one which is obtained by multiplying the RGB brightness for individual inks by each RGB component, Therefore, interpolation in this stage permits conversion from the combination of ink amounts (prescribed by the original correspondence defining data) into the values of components of RGB brightness. The values of components of RGB brightness can be converted approximately into lattice points in the device-independent color space by the matrix operation (such as any known formula to convert sRGB values into Lab values). In this way the combination of ink amounts (prescribed by the original correspondence defining data) is associated with lattice points in the device-independent color space. This eventually implies that lattice points in the low-dimensional color space are associated with lattice points in the device-independent color space. That is, by referencing the original correspondence defining data once when the evaluation function is prescribed, it is possible to prepare the smoothness evaluation function having as a variable the lattice point position information in the low-dimensional color space, while adding the rule of color separation which is taken into account when the original correspondence defining data is prepared.

There are several methods for evaluating smoothness. A simple method is by using a function which contains the absolute value of the sum of the vectors which are oriented toward the lattice point adjacent to the lattice point to be optimized and which are also oriented in approximately mutually opposite directions. In other words, the sum of the vectors which are directed toward the adjoining lattice point and in approximately mutually opposite directions takes on a value "0" when both vectors have the same magnitude and are oriented in the exactly opposite directions. Therefore, if the smoothness evaluation function is the function that contains the absolute value of the sum, then by minimizing its value, it is possible to bring the lattice point to be optimized close uniformly to their neighboring lattice points and to bring the lattice point to be optimized close to the straight line connecting the neighboring lattice points. In this case, if optimization is performed on a plurality of lattice points, it is possible to improve smoothness of the arrangement of these lattice points.

Also, the smoothness evaluation function takes on a form which varies for each region in the color gamut as mentioned above. It is acceptable so long as it can move lattice points adequately when the lattice points to be optimized move differently depending on their position. The function form which varies for each region in the color gamut is the one which is intended to maintain the size of the color gamut. In other words, if the lattice points present on the boundary of the color gamut are allowed to move freely when the lattice point to be optimized are optimized, then the lattice points move toward the outside or inside the color gamut. If the lattice points move toward the outside of the color gamut, it is meaningless because that color cannot be output. (Such a color is brought back into the color gamut by gamut mapping mentioned later.) If the lattice points move toward the inside of the color gamut, the result is that the range of colors to be originally expressed by the printing apparatus is narrowed and the ability to express the tone by printing is deteriorated.

So, in the case where lattice points to be optimized belong to the edge line on the boundary of the color gamut, the lattice points which exist on the edge line and also exist in the mutually opposite sides (with respect to the lattice points to be optimized) are made adjoining lattice points and the function containing the absolute value of the sum of the vectors, which are directed from the lattice point to be optimized to the adjacent lattice points and are approximately oriented in the mutually opposite direction, is made the smoothness evaluation function. In this construction, the object for comparison of smoothness is only the adjoining lattice points on the edge line, and hence the direction in which lattice points to be optimized are moved so that the value of the smoothness evaluation function is effectively varied is the direction along the edge line. This makes it easy to move the lattice points to be optimized along the edge line. Therefore, it is possible to easily maintain the size of the color gamut.

Of course, it is possible to construct such that the lattice point to be optimized move only along the edge line. That is, in the color system, such as RGB and CMY color systems, which expresses the brightness and density of each color by color component values, at least one of the component values of each color takes on the minimum value or maximum value at the boundary of the color gamut. Therefore, on the edge line of the boundary of the color gamut, two of the color component values take on minimum or maximum values and the other one is variable. Thus, the lattice points can be made to move on the edge line if a prescribed constraint condition is imposed on the lattice point position information as the variable of the smoothness evaluation function, with any one of the color component values left variable and the other color component value fixed.

In addition, the region of the color gamut may be the outer plane on the color gamut in addition to the above-mentioned edge line. In other words, if the lattice point to be optimized belongs to the outer plane on the boundary of the color gamut, the neighboring lattice points are those lattice points which exist on said outer plane and exist at the opposite side with respect to the lattice point to be optimized, and the smoothness evaluation function is the function which contains the absolute value of the sum of vectors which are directed from the lattice point to be optimized to the adjacent lattice points and are approximately oriented in the mutually opposite directions. In this case, the objects for comparison of smoothness are only the neighboring lattice points on the outer plane, and hence the lattice point to be optimized for which the values of the smoothness evaluation function are to be effectively varied may be moved along the outer plane and it is easy to move the lattice point to be optimized along the outer plane of the color gamut. Therefore, it is possible to easily maintain the size of the color gamut.

Incidentally, the neighboring lattice points are a set of two lattice points which exist at mutually opposite sides with respect to the lattice point to be optimized, and two sets of such neighboring lattice points (four in total) may be used. In such a case, the lattice point to be optimized may be moved along the outer plane of the color gamut. Of course, it is possible to adopt three sets of neighboring lattice points (six in total). Moreover, it is possible to arrange such that the lattice point to be optimized move only on the outer plane. That is, in the color system, such as RGB and CMY color systems, which expresses the brightness and density of each color by the color component value, at least one of the color component values takes on a minimum or maximum value on the outer plane of the boundary of the color gamut. Thus, the lattice points can be made to move on the outer plane if a prescribed constraint condition is imposed on the lattice point position information as the variable of the smoothness evaluation function, with any two of the color component values left variable and the other color component value fixed.

In addition, the region of the color gamut may be the inside of the color gamut in addition to the above-mentioned edge line and outer plane. In other words, if the lattice point to be optimized belongs to the inside from the boundary of the color gamut, the neighboring lattice points are those lattice points which belong to the color gamut and exist in the mutually opposite sides with respect to the lattice point to be optimized, and the smoothness evaluation function is the function which contains the absolute value of the sum of vectors which are directed from the lattice point to be optimized to the adjacent lattice points and are approximately oriented in the mutually opposite directions. In this case, the objects for comparison of the degree of smoothness are the neighboring lattice points which adjoin in the periphery of the objects to be optimized.

Here, if the neighboring lattice points are a set of two lattice points which are mutually opposite with respect to the lattice point to be optimized, and three sets of such neighboring lattice points (six in total) are used, then the lattice point to be optimized can be moved three-dimensionally inside the color gamut. Of course, it is also possible to adopt more than three sets of neighboring lattice points (more than six in total). Incidentally, the lattice point to be optimized is one which is inside the color gamut (or one which exists inside the color gamut excluding the boundary of the color gamut). However, the lattice point on the boundary of the color gamut may be the neighboring lattice point so long as it belongs to the inside of the color gamut.

As mentioned above, it is possible to evaluate smoothness by means of the absolute value of the sum of vectors which are directed toward the adjoining lattice point adjoining the lattice point to be optimized and are approximately oriented in the mutually opposite directions. On the other hand, it is also possible to prevent smoothness of the arrangement from decreasing for the lattice points each other which exist in the region different among the above-mentioned regions of the color gamut. The foregoing is typically embodied in the smoothness evaluation function with an additional term which is obtained by multiplying an equation by a weighting factor, said equation expressing the magnitude of difference between the lattice point position information of the low-dimensional color space before said variation and the lattice point position information of the low-dimensional color space after said variation, and said weighting factor increasing in value in proportion to departure from the middle point of the color component value of said low-dimensional color space.

In other words, the equation, which expresses the magnitude of difference between the lattice point position information of the low-dimensional color space before variation and the lattice point position information of the low-dimensional color space after variation, takes on a larger value as the lattice point position information varies; therefore, if this equation is multiplied by the weighting factor, which increases in value in proportion to departure from the middle point of the color component value of the low-dimensional color space, the smoothness evaluation function takes on a value which is larger if the lattice point specified by the lattice point position information is the one corresponding to the color component value away from the middle point of the color component value of the low-dimensional color space or as the color component value varies (or as the lattice point moves).

Therefore, by minimizing this smoothness evaluation function, it is possible, when the lattice point arrangement is optimized, to make it harder for the color component vale to depart from the middle point at the low-dimensional color lattice point specified by the lattice point position information. The low-dimensional color lattice point whose color component value departs from its middle point is the lattice point close to the boundary of the color gamut. It follows, therefore, that the closer the lattice point is to the boundary of the region of the color gamut, the harder it is to move the lattice point.

Also, this weighting factor should be such that its value increases in proportion to departure from the middle point of the color component value of the low-dimensional color space. As an example, it is possible to adopt a weighting factor constructed such that its value increases at a larger rate as the color component value of the low-dimensional color space departs from its middle point. In other words, when the color component value of the low-dimensional color space is varied from the middle point (the central point of the range) to the maximum value or minimum value, the weighting factor remains small if the color component value is close to its middle point and, as the color component value departs from its middle point, the weighting factor increases at a rate greater than the rate at which the color component value increases.

Therefore, it is possible to eliminate almost completely the influence of the weighting factor when the color component value is near the middle point, and it is possible to smooth the arrangement of lattice points highly freely. Of course, it is possible to adequately control the degree of increase of the weighting factor so as to avoid the situation in which freedom for movement rapidly changes when the degree of increase of the weighting factor is made steeper than the degree of increase of the color component value.

In the meantime, the above-mentioned method for determining lattice points to be referenced to prepare the correspondence defining data may be utilized to make lattice points to be referenced to prepare the correspondence defining data by means of a computer and other various apparatus. Therefore, the present invention may be practiced as an apparatus as well as a program product. Once determined by the present invention, the lattice points used for preparing the correspondence defining data make it possible to measure the colors output by a printer with the amount of ink specified by them, and the thus measured values make it possible to associate the amount of ink with the color used by other image apparatus (such as display). The processing apparatus that uses such LUTs and profiles is also within the scope of the present invention.

In other words, the present invention covers a print controlling apparatus, a print controlling method, and a print controlling program product, each using the correspondence defining data. Such an apparatus and method may be practiced individually or incorporated into a certain apparatus. The present invention may be practiced in various embodiments, including recording media storing software. The recording media include magnetic recording medium, magneto-optical recording media, or any kind of recording media which will be developed in the future. The software may be in the form of primary or secondary copy.

The software may be provided through communication lines. The present invention may be embodied partly in the form of software and partly in the form of hardware. The software may be stored partly in the storage device and read in according to need. The software may be used in combination with an external program product, so long as it makes the computer to realize the necessary functions.

DESCRIPTION OF THE PREFERRED EMBODIMENTS

The preferred embodiments of the present invention will be described below in the following order.
(1) Preparation of color-correcting LUT and outline of smoothing.
(2) Print controlling apparatus.
(3) Smoothing process.
(4) Optimization by means of evaluation function.
    (4-1) Evaluation function $E_1$:
    (4-2) Evaluation function $E_2$:
    (4-3) Evaluation function $E_3$:
(5) Another embodiment.

(1) Preparation of Color-correcting LUT and Outline of Smoothing.

Figure 1:
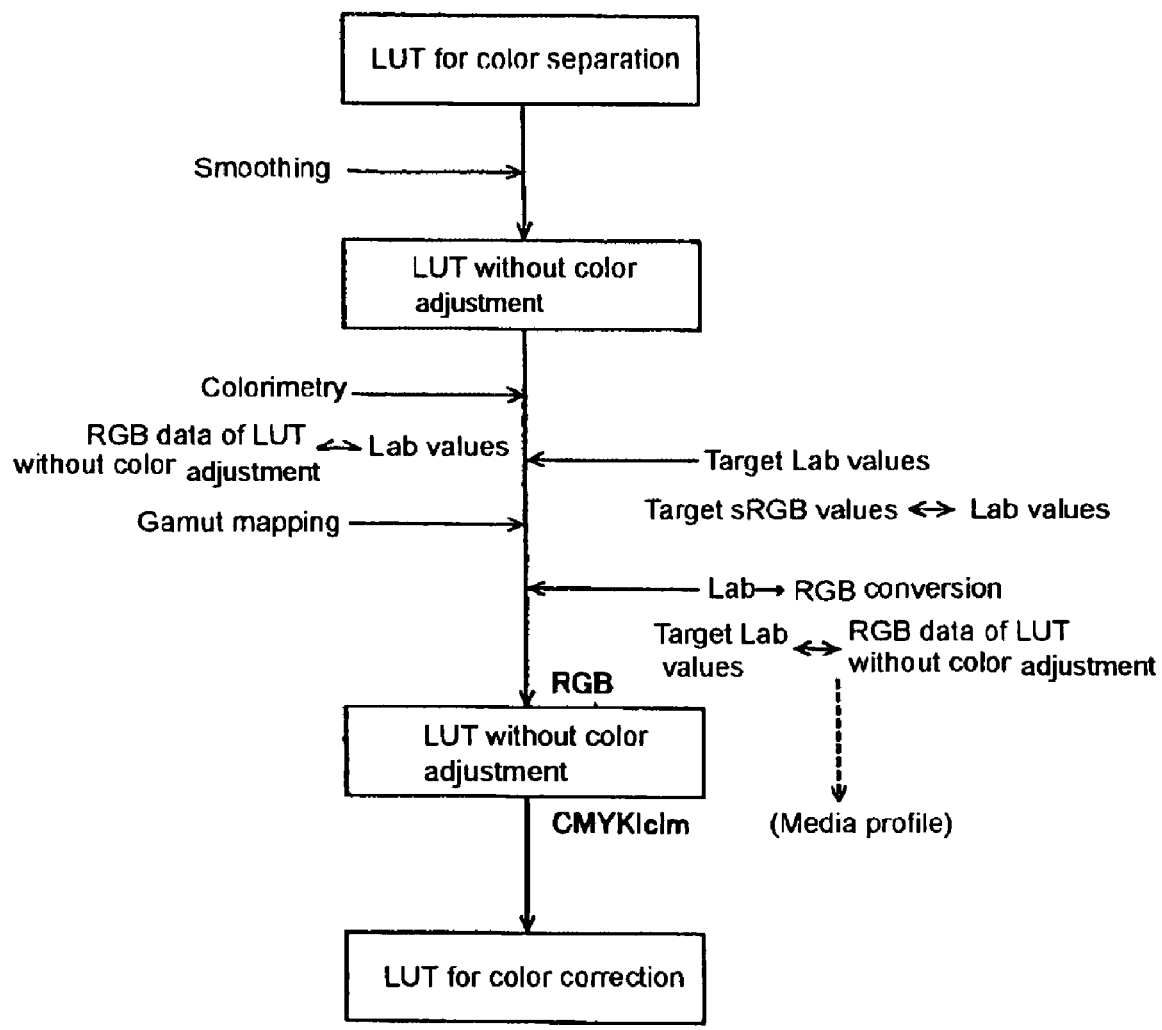
FIG. 1 is a schematic diagram illustrating the steps for preparing the color-correcting LUT.
Figure 2:
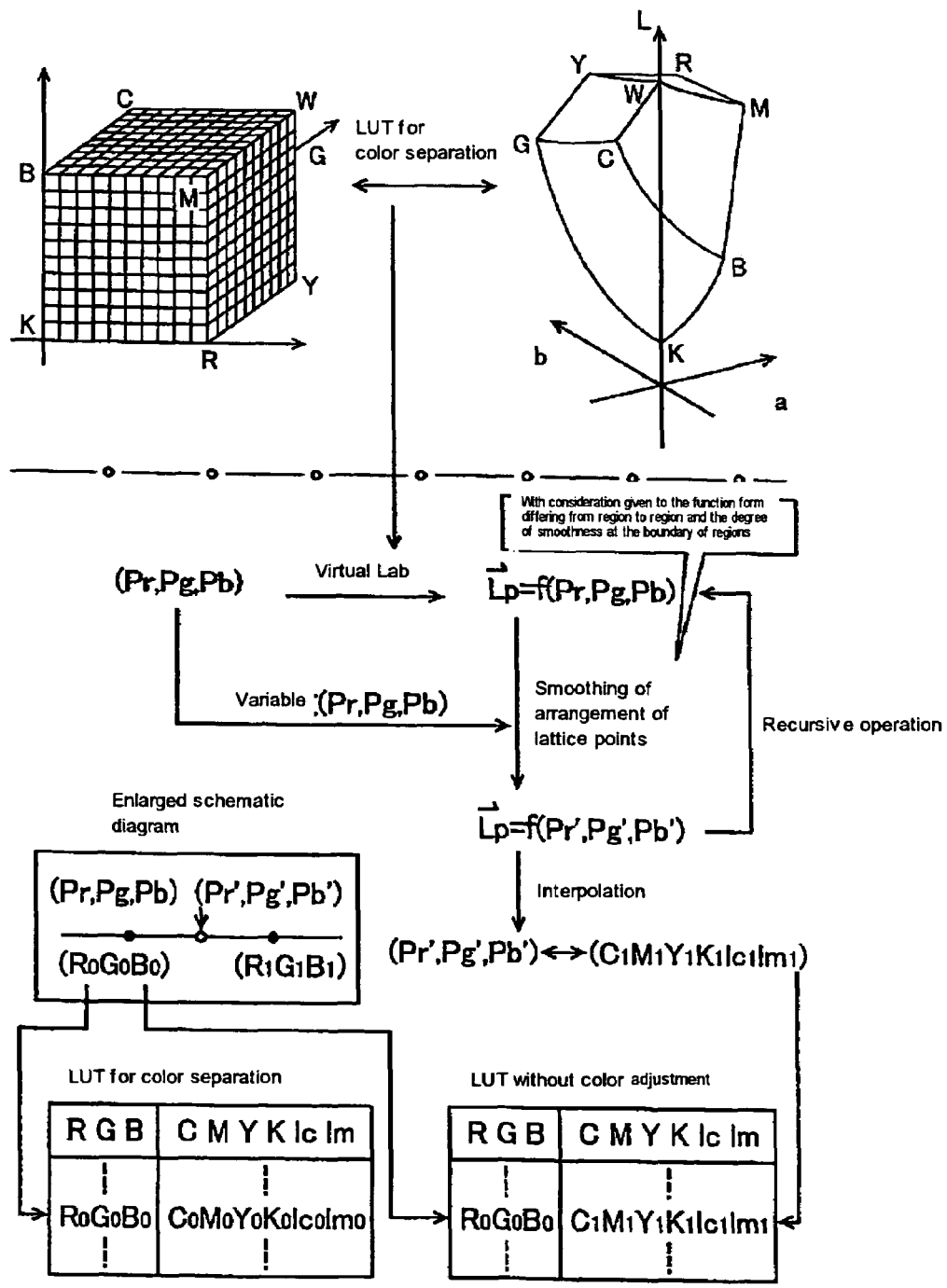
FIG. 2 is a schematic diagram illustrating the smoothing procedure.

FIG. 1 is a schematic diagram illustrating the process of preparing the color-correcting LUT which is referenced when printing is executed by a printer. FIG. 2 is a schematic diagram illustrating the smoothing which is executed when the color-correcting LUT is prepared. These processes should preferably be carried out by using a computer because they involve a large amount of computation. Actual printing should preferably be carried out by a printer which uses the color-correcting LUT which has been prepared. In addition, the halftoning (HT) mentioned later should be carried out by the same algorithm for halftoning employed by the printer.

The color-correcting LUT in this embodiment is a table which defines the correspondence between sRGB data and CMYKlclm data for a plurality of reference points. If these referencing points are referenced for interpolation, it is possible to associate any color in sRGB data with any color in CMYKlclm data. In order to prepare this color-correcting LUT in this embodiment, it is necessary to previously prepare the color-separating LUT. The color-correcting LUT corresponds to "the correspondence defining data" as used in Claim and the color-separating LUT corresponds to "the original correspondence defining data" as used in Claim. In this embodiment, the color-separating LUT is one which is prepared by converting three-dimensional RGB data into six-dimensional CMYKlclm data in conformity with rules and associating the results; it defines the correspondence between RGB data and CMYKlclm data for a plurality of reference points.

In other words, one color that is expressed by a combination of six colors of CMYKlclm can be expressed by a combination of different CMYKlclm values, and it is troublesome to univocally determine the CMYKlclm data corresponding to a color represented by RGB data. Therefore, the LUT defines the correspondence between RGB data and CMYKlclm data on the assumption such correspondence conforms to a specific rule. Since the correspondence between RGB data and CMYKlclm data is established according to a specific rule, the color-separating LUT differs from the color-correcting LUT in that the color indicated by the RGB data at the reference point (to be used by the image apparatus) does not always agree with the color indicated by the CMYKlclm data.

Incidentally, the RGB data and CMYKlclm data employ the range of tone values which is identical with the range of tone values (usually from 0 to 255) which is used in various image apparatus. Also, since each RGB color is complementary to each CMYK color, it may be assumed that C=255−R, M=255−G, and Y=255−B if it is not necessary to strictly define any color by tone values. In this sense, the RGB data in the color-separating LUT may be the CMY data. The above-mentioned specific rule is not limited to only one. The rule provides, for example, that if RGB data is regarded as identical with CMY data, an equal amount a is subtracted from each tone value of CMYK and C=M=Y=a is replaced by the tone value b of K and the remainder of C and M is replaced by lc and lm in a certain ratio. In other words, this rule provides that each tone value of CMY is replaced by each tone value of CMYKlclm which is deemed equivalent.

In addition, since each tone value of CMYKlclm specifies the amount of each color ink to be used, it is determined by considering the condition of limiting inks to be used. This condition limits the amount of ink per unit area below a certain level and also limits the amount of specific inks in order to control ink deposition that affects granularity and appearance (which differs depending on light source). Moreover, the color gamut should be as wide as possible because the image quality is improved with the increasing number of the colors which can be expressed by combination of CMYKlclm inks.

These rules play a very important role at the time of printing to be executed by referencing the color-correcting LUT which is eventually prepared. Without these rules, printing will be hampered and high-quality printing will be impossible. On the other hand, these rules may be taken into account at the stage of adjusting the amount of inks of CMYKlclm; however, it is not desirable to adjust the amount of inks of CMYKlclm again when the color-correcting LUT is prepared after the color-separating LUT has been prepared. If adjustment is to be made to the correspondence between the RGB values and the CMYKlclm values prescribed in the color-separating LUT, it is necessary to make adjustments in conformity with the rules at the time of adjustment. So, according to the present invention, the color-correcting LUT is prepared by performing smoothing (mentioned later) while keeping the limit on ink deposition (mentioned above) which is taken into consideration in the color-separating LUT, thereby prescribing the strict correspondence between the colors expressed by RGB data and CMYKlclm data after processing.

Smoothing is defined as the process for smoothing the arrangement of lattice points in the Lab color space, each lattice point representing the color produced by the combination of CMYKlclm data specified in the color-separating LUT. That is, in the color-separating LUT, the arrangement of lattice points has a low degree of smoothness when the color defined by the combination of CMYKlclm data is expressed by the lattice points in the Lab color space. The state in which the arrangement of lattice points has a low degree of smoothness is a state in which a curve is described by a high-order function, said curve connecting adjacent lattice points in the Lab color space and extending from one boundary to the other of the color gamut formed in the Lab color space.

The color-correcting LUT is prepared with the help of interpolation, as mentioned later. And, the color conversion referencing the color-correcting LUT also employs interpolation. There are several methods for interpolation, such as linear interpolation and spline interpolation. Any of these methods calculates the color at the lattice point for interpolation from the lattice points existing around the lattice point for interpolation. Therefore, if the arrangement of lattice points has a low degree of smoothness (or the above-mentioned curve is that of a high-order function), the accuracy of interpolation decreases.

As mentioned above, with the low accuracy of interpolation, it is impossible to accurately define the correspondence between RGB data and CMYKlclm data which are defined by the color-correcting LUT to be eventually prepared. This leads to a low accuracy of color conversion at the time of printing. Moreover, the arrangement of the lattice points represented by CMYKlclm data prescribed by the color-separating LUT is not uniform as a whole in the degree of smoothness. It varies depending on the positions in the Lab color space and the accuracy of interpolation also differs in the color space. This leads to local variation in the accuracy of color conversion. Printing in this state does not give a high-quality image with a smooth color change. This is true particularly in the printing of an image having a continuous color gradation.

Therefore, in the present invention, the arrangement of lattice points is smoothed by the smoothing process. The color-separating LT defines correspondence between RGB data and CMYKlclm data as mentioned above. For RGB data, the pitch of individual RGB colors is fixed constant so that the lattice points form the cubic lattice points in the RGB color space (which is an orthogonal three-dimensional space) as shown in the upper left part in FIG. 2. It can be said that these cubic lattice points are free of distortion in arrangement and are highly smooth.

On the other hand, the color gamut defined by CMYKlclm data is distorted in the Lab color space. That is, the upper right part of FIG. 2 shows the color gamut in the Lab color space. As shown in this figure, the color gamut in the Lab color space has a distorted shape. Also, no consideration is given to the arrangement of mutually adjacent lattice points in the color-separating LUT, and the CMYKlclm data is determined in conformity with the above-mentioned rules. Therefore, if the color expressed by CMYKlclm data is arranged in the Lab color space, the lattice points are arranged as if there exist lattice points disorderly in the distorted color gamut. In other words, the arrangement of lattice points has a low degree of smoothness.

Consequently, the smoothing process in this embodiment is carried out as follows. The arrangement of lattice points for the color due to the CMYKlclm data defined by the color-separating LUT is smoothed in the virtual Lab color space, and the color-separating LUT in which the arrangement of lattice points has a high degree of smoothness is prepared. (This LUT is referred to as the no color adjustment LUT in this specification.) The lower part of FIG. 2 outlines the procedure to prepare the color-correcting LUT from the color-separating LUT. In this embodiment, the position of the RGB lattice point in the color-separating LUT is specified by the position information (Pr, Pg, Pb), and this position information as a variable is used to represent the lattice point in the virtual Lab color space in terms of vector $L_p = f(Pr, Pg, Pb)$. The position information is updated sequentially.

In other words, the position information (Pr, Pg, Pb) is updated sequentially by recursive operation, so that the position of the lattice point represented by vector $L_p$ is adjusted until the position of the lattice point to be adjusted becomes smooth relative to the position of the surrounding lattice points. In this way the arrangement of lattice points in the virtual Lab color space is smoothed. Incidentally, the position information in this embodiment includes the number of lattice points in the direction of $0 \leq Pr \leq R$ minus 1, the number of lattice points in the direction of $0 \leq Pg \leq G$ minus 1, and the number of lattice points in the direction of $0 \leq Pb \leq B$ minus 1. This position information may be RGB data so long as it can specify the position of the lattice point. However, the RGB data specified in the color-correcting LUT is identical to the RGB data specified by the color-separating LUT, as mentioned later. Therefore, even in this case, the position information is used to update the CMYKlclm data but is not used to update the values of the RGB data prescribed in the color-separating LUT. Here, the above-mentioned f is the evaluation function to evaluate smoothness of the arrangement of lattice points in the virtual Lab color space. It has the above-mentioned position information as the variable; however, there may be an instance in which, if each position information is made arbitrarily updatable, freedom for movement of lattice points becomes excessive and it is impossible to maintain the size of the color gamut.

Consequently, the present invention employs an evaluation function in a form which varies for each region of the color gamut to which the lattice point to be optimized belongs, and the position of lattice points is adjusted by limiting the variable that can be updated for the region of the color gamut. However, if the function and updatable variable vary for each region of the color gamut, there is no relationship between lattice points on the boundary of the region and it is impossible to control smoothness of the arrangement for lattice points existing on the boundary of these regions. So, the present invention employs the evaluation function of the form which varies for each region of the color gamut but prescribes the evaluation function containing the constraint condition to consider smoothness of the arrangement of lattice points on the boundary of the region of the color gamut. As the result, it is possible to prevent smoothness from remarkably decreasing on the boundary of the region of the color gamut while using the evaluation function of the form which varies for each region of the color gamut in the course of the above-mentioned recursive calculations.

The lattice point in the virtual Lab color space has as its components the Lab value which is obtained by performing simple operation on the calorimetric value of a small number of color charts, thereby giving a virtual RGB brightness, and then converting it by a prescribed operational expression. This operation is simple one; but the operational expression is not physically meaningless. Rather, smoothing the arrangement of the lattice point gives the lattice point whose arrangement is sufficiently smoothed even in the actual Lab color space. In other words, the above-mentioned simple operation is one which is obtained by simplifying the Lambert-Beer's law. (Shimpen Shikisai Kagaku Handbook, 2nd edition, issued by Tokyo Daigaku Shuppnkai, p. 222)

This operation gives an approximate actual Lab value for CMYKlclm data. So, this Lab value is regarded as the virtual Lab value in this specification.

So, this Lab value is regarded as the virtual Lab value in this specification. If the position information (P'r, P'g, P'b) is determined such that it becomes the lattice point whose arrangement has a high degree of smoothness in the virtual Lab color space, then it is possible to prepare the above-mentioned no color adjustment LUT by calculating the amount of ink corresponding to the position information (P'r, P'g, P'b) by using the color-separating LUT. The enlarged schematic diagram in FIG. 2 shows the relation between the RGB data and the position information before and after smoothing. In this figure, black circles on the straight line denote the lattice points in the RGB color space, and the RGB data at each lattice point include $R_0$, $G_0$, $B_0$, and $R_1$, $G_1$, $B_1$.

When the lattice point whose RGB data include $R_0$, $G_0$, $B_0$ is the object for smoothing, it is assumed that the position information is (Pr, Pg, Pb) and the position information (P'r, P'g, P'b) indicating the position of lattice point corresponding to the white circle is obtained after smoothing. In this case, this position information specifies the lattice point of white circle, which is surrounded by lattice points associated with the CMYKlclm data that satisfy the above-mentioned rule for color separation. Thus, this data is used for interpolation to calculate the data $C_1 M_1 Y_1 lc_1 lm_1$ corresponding to the lattice point indicated by the white circle. Thus, the RGB data ($R_0$, $G_0$, $B_0$) for the lattice point to be smoothed is associated with the CMYKlclm data ($C_1 M_1 Y_1 lc_1 lm_1$). The result is the no color adjustment LUT.

The smoothing process mentioned above permits one to calculate the CMYKlclm data corresponding to the position of the lattice point which has been optimized, while referencing only the CMYKlclm data defined by the color-separating LUT, thereby preparing the no color adjustment LUT in which the arrangement of lattice points in the Lab color space has a high degree of smoothness. In other words, the smoothing process is carried out in the virtual Lab color space and its variable is the position information. If it is so constructed that the position information is updated, it is possible to freely move the virtual Lab lattice point without considering the above-mentioned rule for color separation at the time of recursive operation. However, after the lattice point has been optimized, it references the CMYKlclm data defined by the color-separating LUT and calculates the CMYKlclm data corresponding to the position information after optimization.

Therefore, it is possible to acquire the CMYKlclm data after optimization only from the CMYKlclm data which is defined by the color-separating LUT and which satisfies the above-mentioned rule for color separation. That is, when there exist a large number of combinations of CMYKlclm corresponding to a certain color, it is possible to guarantee that the CMYKlclm data after optimization also satisfies the above-mentioned rule for color separation if interpolation is performed by referencing the CMYKlclm data which satisfies the rule for color separation. Incidentally, linear interpolation is desirable because its results do not deviate from the CMYKlclm data that satisfies the rule for color separation. Of course, non-linear interpolation would also roughly satisfy the rule for color separation.

As the result, it is possible to perform smoothing while keeping the various rules which were taken into account when the color-separating LUT was prepared, and it is possible to prepare the no color adjustment LUT which satisfies simultaneously the various rules, the arrangement of lattice points having a high degree of smoothness, and the locally nonuniform arrangement of lattice points. The arrangement of lattice points corresponding to the color prescribed by the no color adjustment LUT has a high degree of smoothness in the Lab color space, and since they are arranged as intended by the user who prepares the no color adjustment LUT, and consequently it is possible to execute accurate interpolation by referencing the color prescribed by the no color adjustment LUT, and it is also possible to prepare the no color adjustment LUT capable of color conversion as intended by one who prepares the LUT.

The no color adjustment LUT which has been prepared as mentioned above satisfies the various rules which were taken into account when the above-mentioned color-separating LUT was prepared and also prescribes the reference points that make smooth the arrangement of lattice points; however, it is not always the case that the color (specified by sRGB) having color component values of image data based on RGB data prescribed by the no color adjustment LUT agrees with the color resulting from printing based on the corresponding CMYKlclm data. In other words, this correspondence merely conforms to the above-mentioned rules when the above-mentioned color-separating LUT was prepared, and it is not guaranteed that both colors agree with each other.

So, the color-correcting LUT, which makes these colors agree with each other, is prepared. However, if the color systems are different, it is difficult to judge the agreement of colors. Consequently, in this embodiment, the color expressed by sRGB data in the Lab color space is made to correspond to the color expressed by CMYKlclm data. At the time of transformation from one color system to the other, interpolation is carried out. Since the color-correcting LUT mentioned above has been smoothed so that accurate interpolation is carried out, it is possible to prepare the color-correcting LUT which permits accurate color transformation by the accurate interpolation.

The first step to prepare the color-correcting LUT is to print a plurality of patches based on RGB data prescribed by the no color adjustment LUT, thereby acquiring color charts. In this no color adjustment LUT, the RGB data correspond to the CMYKlclm data and hence printing based on this RGB data is equivalent to printing based on the CMYKlclm data prescribed by the no color adjustment LUT. Once color charts are obtained, colorimetry is performed sequentially on the patches of charts by using a colorimeter. In this way it is possible to acquire the Lab values of patches printed according to RGB data prescribed by the no color adjustment LUT. On the other hand, the sRGB data as the reference points to be registered in the color-correcting LUT should be previously determined. (In this embodiment, this sRGB data is referred to as target.) It is possible to easily acquire the Lab values corresponding to the target because the Lab values corresponding to sRGB data can be obtained by the known formula.

If it is known that a color indicated by sRGB data takes on a certain value in the RGB color system prescribed in the no color adjustment LUT, then it is possible to prepare the color-correcting LUT which makes sRGB data to correspond to CMYKlclm data by converting RGB data into CMYKlclm data while referencing the no color adjustment LUT. So, interpolation is carried out by referencing the Lab values of the patches printed according to RGB data prescribed in the no color adjustment LUT and the RGB data corresponding to the Lab values of the color expressed by the sRGB data is acquired.

And, the CMYKlclm data corresponding to the RGB data is acquired by referencing the no color adjustment LUT. Since this RGB data correspond to the Lab values of the color expressed by the sRGB data, the color expressed by the CMYKlclm data agrees with the color expressed by the sRGB data. Therefore, it is possible to prepare the color-correcting LUT by preparing the table which associates them with each other. Incidentally, in this embodiment, gamut mapping is performed before the Lab values of target are associated with the RGB data in the no color adjustment LUT.

In other words, the color gamut of the color that can be expressed by sRGB data differs in magnitude from the color gamut of the color that can be expressed by the RGB data prescribed by the no color adjustment LUT; therefore, the color gamut is compressed so that they agree with each other. Of course, various corrections other than gamut mapping may be carried out. For example, color correction may be made such that the corrected color is close to the human's memory color, because the human's memory color differs from the actual color (humans tend to remember the color of the sky and skin more vividly than actual). In any case, it is possible to prepare the color-correcting LUT which associates sRGB data with CMYKlclm data by the data prescribed in the no color adjustment LUT if any color is examined in terms of Lab value by colorimetry and formula for conversion of sRGB.

Incidentally, smoothing in the present invention is intended to improve the degree of smoothness of the arrangement of lattice points in the device-independent color space; however, if one's attention is paid only to improvement in the degree of smoothness of arrangement, it is possible to carry out smoothing in any stage (shown in FIG. 1) of preparing the color-correcting LUT. However, if the procedure is modified such that smoothing is carried out when the no color adjustment LUT is prepared and subsequently colorimetry is performed to associate it with the target Lab value, it is possible to establish an accurate correspondence between the target Lab value and the RGB data of the no color adjustment LUT.

In other words, the degree of smoothness of the arrangement of lattice points improves even in the case where smoothing is accomplished in the device-independent color space by means of the Lab values obtained by colorimetry which is performed on color charts obtained before smoothing is carried out based on the RGB data prescribed in the color-separating LUT and the CMYKlclm data. However, the Lab values after smoothing differ in color from the CMYKlclm data of the object for color measurement. Also, even though one attempts to calculate by interpolation the CMYKlclm data corresponding to the Lab value after smoothing, it is impossible to perform accurate interpolation because the neighboring Lab values to be referenced at the time of interpolation are lattice points before smoothing.

Therefore, in any way, the Lab values after smoothing vary in color from the CMYKlclm data prescribed in the color-separating LUT. Even though the color-correcting LUT is prepared under this condition by associating the Lab values after smoothing with the target Lab values, it is impossible to accurately define the correspondence between the sRGB data defined by the color-correcting LUT and the CMYKlclm data, and the accuracy for color transformation at the time of printing becomes poor. On the other hand, in the present invention, smoothing is performed in the device-independent color space, the CMYKlclm data corresponding to the optimized position information is acquired by interpolation based on the CMYKlclm data prescribed by the color-separating LUT, the no color adjustment LUT is prepared, and subsequently colorimetry is carried out to associate the RGB data of the no color adjustment LUT (or CMYKlclm data) with the target Lab values.

Consequently, there is no possibility that the color corresponding to the colorimetric value deviates from the color represented by the CMYKlclm data. And, when interpolation is carried out to associate the calorimetric value with the target Lab value, accurate results of interpolation can be obtained because the neighboring Lab values referenced at the time of interpolation are the lattice points after smoothing. As the result, it is possible to prepare the color-correcting LUT that permits accurate color transformation by smoothing the arrangement of lattice points in the device-independent color space.

(2) Print Controlling Apparatus.

Figure 3:
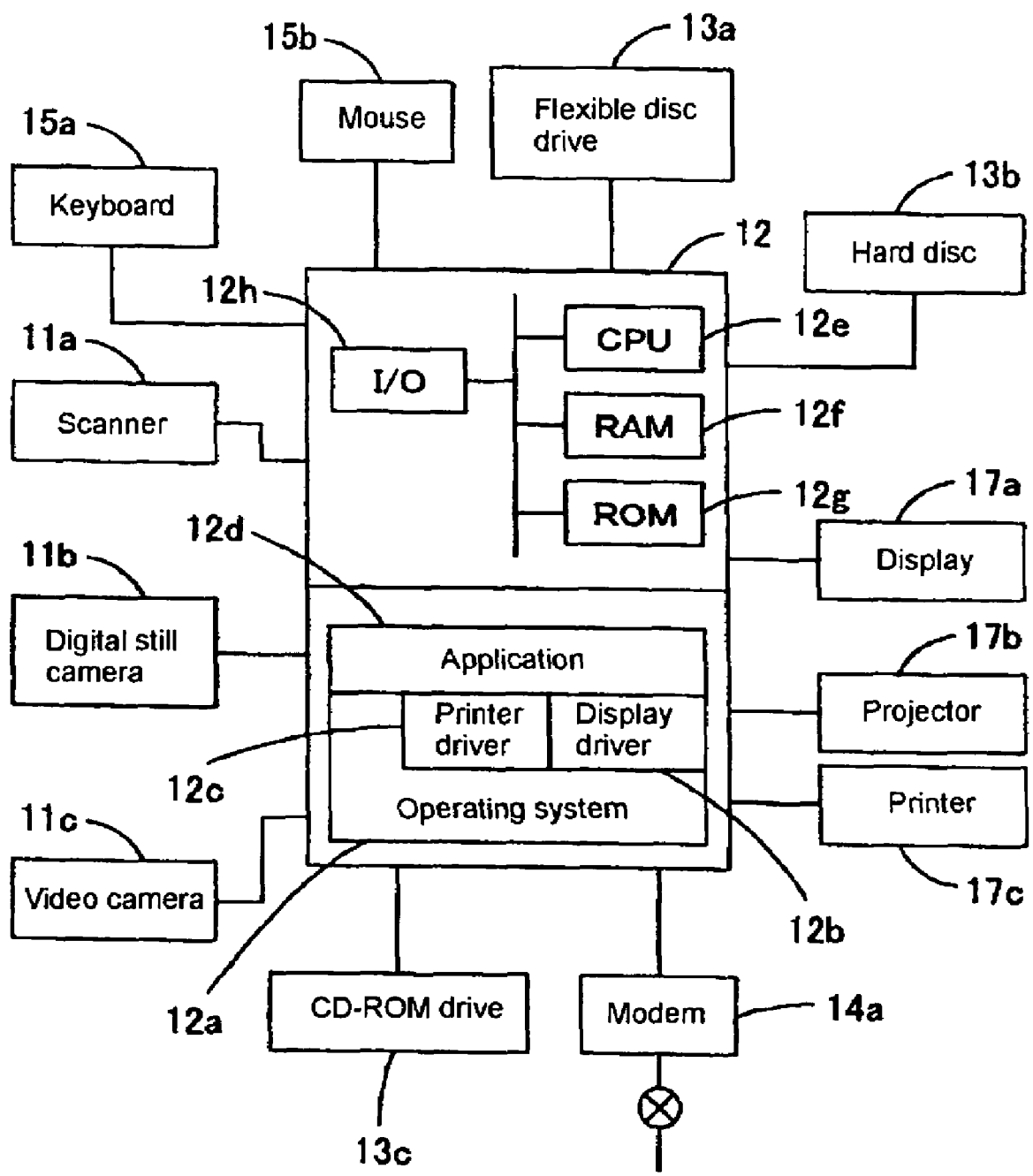
FIG. 3 is a block diagram showing the hardware configuration of the print controlling apparatus.
Figure 4:
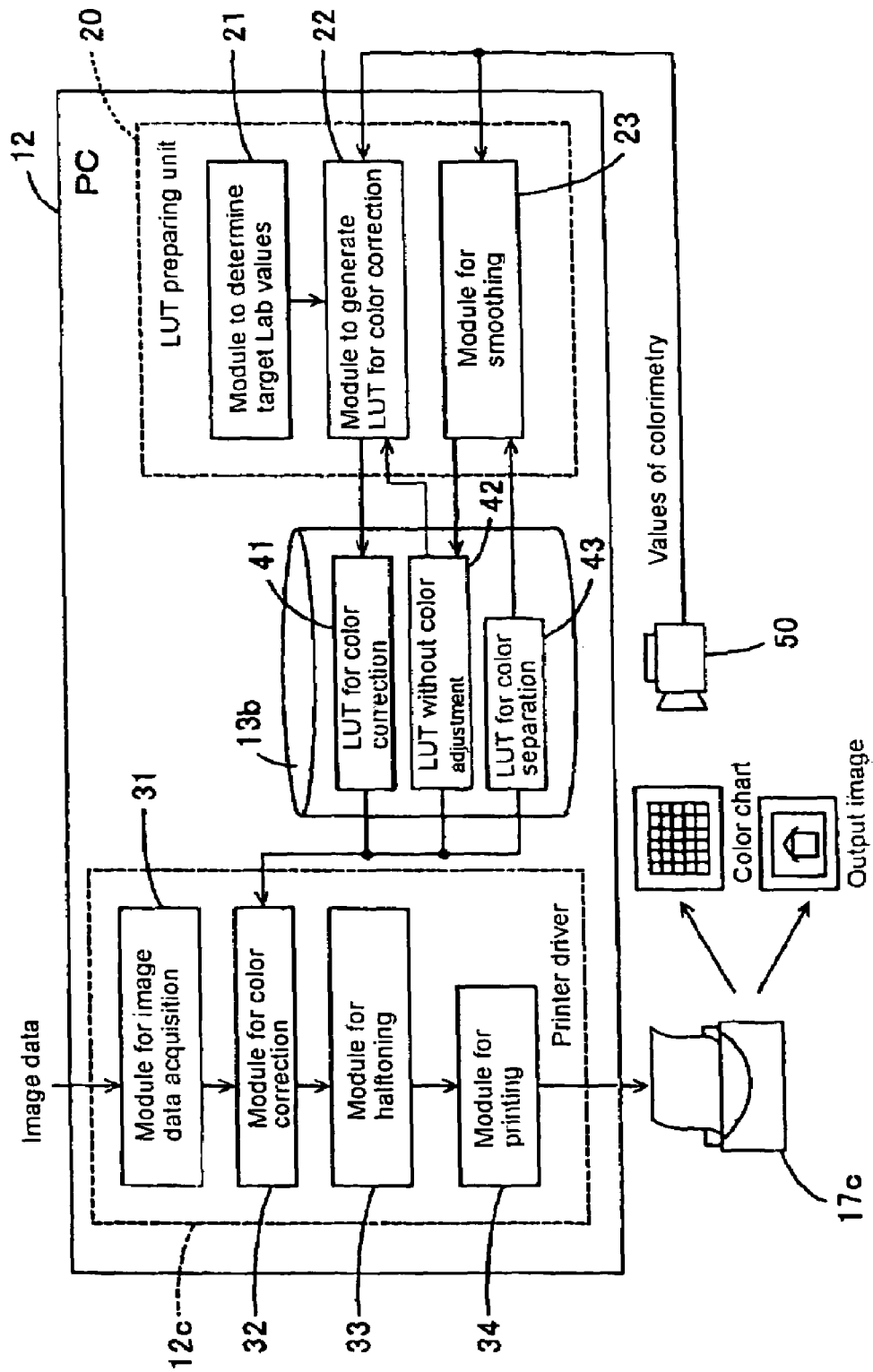
FIG. 4 is a block diagram showing the program to be executed by the print controlling apparatus.

The smoothing process according to the present invention is used to prepare the color-correcting LUT, which is then referenced by the print controlling apparatus when printing is carried out. FIG. 3 is a block diagram showing the hardware structure of the print controlling apparatus. FIG. 4 is a block diagram showing the program to be executed by the print controlling apparatus. The print controlling apparatus pertaining to this embodiment consists of a general-purpose PC. It is connected to a variety of peripherals, as shown in FIG. 3, to process images for printing and perform printing.

That is, the PC 12 is provided with the scanner 11a, the digital still camera 11b, and the video camera 11c, as the image input devices, which are connected to the PC 12. The image of each input device is composed of pixels in dot matrix state and is capable of expressing about 16,700,000 colors, with each of the RGB three primaries representing 256 gradations. In this embodiment, the sRGB color system is used for the image data, so that color conversion can be accomplished by means of the above-mentioned color-correcting LUT.

To the PC 12 are connected the flexible disc drive 13a, the hard disc 13b, and the CD-ROM drive 13c as external auxiliary storage. The hard disc 13b stores the main program relating to the system; it is capable of reading programs from the flexible disc and CD-ROM when necessary. Also, to the PC 12 is connected the modem 14a as the communication device to connect the PC 12 to the external network. The modem 14a is connected to the external network through the public communication lines. The system in this example is constructed such that the modem 14a permits external access through the telephone line; however, access to the network may be achieved through the LAN adaptor. The PC 12 also has the keyboard 15a and mouse 15b connected thereto for input operation.

The PC 12 is further provided with the display 17a, the printer 17c, and the projector 17b as image output devices. The display 17a has a display area composed of 800 pixels in the horizontal direction and 600 pixels in the vertical direction, with each pixel displaying 16,700,000 colors as mentioned above. This resolution is merely an example. It may be changed to 640×480 pixels or 1024×768 pixels according to circumstances. The printer 17c is an ink-jet printer which is capable of printing images on printing paper (as a medium) with dots of color inks of six colors of CMYKlclm.

On the other hand, prescribed programs are executed by the PC 12 in order to input images by using the image input devices and to display or output them on the image output devices. Of these programs, the one which works as the basic program is the operating system (OS) 12a, which includes the display driver 12b for display on the display 17a, the printer driver 12c for print output to the printer 17c, and the projector driver 12i (not shown) for display on the projector 17b.

These drivers 12b, 12c, and 12i are dependent on the kind of the display 17a, the printer 17c, and the projector 17b. They may be added or modified for the operating system 12a according to the kind of the device. They may realize additional functions more than the standard process depending on the kind of device. It is possible to realize various additional processing within the permissible range while maintaining the common processing system on the standard system called the operating system 12a.

As the premise for execution of these programs, the PC 12 has the CPU 12e, the RAM 12f, the ROM 12g, and the I/O 12h. The CPU 12e, which performs arithmetic operation, executes the basic programs written in the RAM 12f while using the RAM 12f as a temporary work area or memory area or program area, thereby controlling the external and internal devices connected through the I/O 12h.

The application 12d is executed on the operating system 12a as the basic program. What is processed by the application 12d is widely varied. It monitors the operation of the keyboard 15a and the mouse 15b as the operating device, controls adequately the external devices (when operated) and executes the corresponding arithmetic operations, and displays the results of processing on the display 17a or outputs them to the printer 17c. The computer system mentioned above acquires image data by means of the scanner 11a as the image input device and then performs prescribed image processing by the application 12d. It finally displays or outputs the results on the display 17a, the printer 17c, or the projector 17b as the image output device.

Therefore, in this embodiment, the print controlling apparatus is realized as the computer system; however, such a computer system is not always necessary, and it may be any system capable of image processing by the present invention for the similar image data. For example, the system may be such that the digital still camera is provided with a module that performs image processing and the image data which has undergone image processing is used for printing on the printer.

Also, in the printer that performs printing with input of image data without passing through the computer system, it is possible to construct the system such that it automatically performs image processing and printing according to the present invention for the image data entered through the scanner, digital camera, or modem. In addition, the system is applicable to various devices, such as color faccimil, color copier, and projector, which handle image data, as a matter of course. Printing may be carried out by distributed processing with a plurality of computers.

When the above-mentioned PC 12 is used as the print controlling apparatus according to the present invention, the necessary processing is carried out as explained in the following. The PC 12 acquires image data representing input image from the scanner 11a, digital camera 11b, and video camera 11c and image data representing output image to the display 17a and projector 17b. It performs color conversion by referencing the color-correcting LUT and then executes printing on the printer 17c. In other words, it performs color conversion by referencing the color-correcting LUT in the case where the same image is handled by different image devices (such as image input device and image output device) and in the case where the color of each pixel in the image data used in each image device is expressed in the different color spaces.

In order to execute printing by using the color-correcting LUT, the above-mentioned PC 12 in this embodiment has the above-mentioned printer driver 12*c*, which performs data processing at the time of printing, and the LUT preparing unit 20, which prepares the color-correcting LUT, as shown in FIG. 4. The printer driver 12*c* has the image data acquisition module 31, color correction module 32, and the halftoning module 33. The image data acquisition module 31 is a module to acquire image data representing the image for printing. When the number of pixels of the acquired image does not match the number of pixels necessary for printing, the image data acquisition module 31 executes resolution conversion to make them match each other. The color correction module 32 is a module to transform the color system of the image data by interpolation, and it acquires image data from the image data acquisition module 31 and transforms the color system.

That is, it references either of the color-correcting LUT 41 or the no color adjustment LUT 42 (both stored in the hard disc 13*c*) and calculates the combination of values of CMYKlclm color components corresponding to the combination of values of arbitrary RGB color components. When the application 12*d* instructs image printing, the color correction module 32 performs color conversion by referencing the color-correcting LUT, thereby executing accurate color conversion. When the LUT preparing unit 20 prepares the no color adjustment LUT 42 or the color-correcting LUT 41, the color correction module 32 performs color conversion by referencing the color-separating LUT 43 or the no color adjustment LUT 42. Therefore, the color correction module 32 performs color conversion by selecting an adequate LUT according to the object, and printing is performed with the data after color conversion.

After the color correction module 32 has performed color conversion and generated CMYKlclm data, the CMYKlclm data is transferred to the halftoning module 33. The halftoning module 33 is a module which converts the CMYKlclm tone values of each dot and performs halftoning process to represent with the recording density of ink drops. It generates the head drive data to make ink adhere in the recording density after conversion. The printing module 34 receives the head drive data and rearranges them in the order for use by the printer 17*c*.

That is, the printer 17*c* is provided with a train of ejecting nozzles (not shown) as the ink ejecting device. The nozzle train has a plurality of ejection nozzles arranged in the secondary scanning direction; therefore, data several dots apart in the secondary scanning direction are used at the same time. So, rasterizing is performed to rearrange the order of data such that, of the data arranged in the primary scanning direction, those which are used at the same time are buffered in the printer 17*c* at the same time. After this rasterizing, the printing module 34 generates printing data (with additional information such as image resolution) and outputs it to the printer 17*c*. The printer 17*c* prints the image represented by the image data according to the printing data.

In this embodiment, the LUT preparing unit 20 is in the PC 12 as the print controlling apparatus, and the LUT preparing unit 20 prepares the color-correcting LUT 41 before printing. The LUT preparing unit 20 has the module 21 to determine Lab values, the module 22 to generate the color-correcting LUT, and the module 23 to perform smoothing. Moreover, the PC 12 has the calorimeter 50 connected thereto through an interface (not shown). The colorimeter 50 measures each patch on the color chart printed by the printer 17*c* and supplies the PC 12 with the resulting calorimetric values, such as Lab values and density values.

In order for the LUT preparing unit 20 to prepare the color-correcting LUT 41, the color-separating LUT 43 is previously prepared and recorded in the hard disc 13*b*, and the no color adjustment LUT 42 is prepared and recorded in the hard disc 13*b* when the color-correcting LUT 41 is prepared. That is, the smoothing module 23 references the color-separating LUT 43 and acquires the calorimetric values of the color chart from the calorimeter 50, and finally it prepares the no color adjustment LUT 42 by the procedure mentioned in detail in the following.

The module 21 to determine Lab values is a module which determines the sRGB data of the target and calculates the color values (Lab values) according to predetermined formulas. The module 22 to generate color-correcting LUT is a module which performs processing to prepare the color-correcting LUT 41 from the no color adjustment LUT 42 by the process shown in FIG. 1. First, the module 22 to generate color-correcting LUT prepares the image data of the patch with each RGB data prescribed in the no color adjustment LUT and outputs the results to the color correcting module 32.

At this time, the color correcting module 32 references the no color adjustment LUT 42, thereby acquiring CMYKlclm data corresponding to each RGB data, and transfers the CMYKlclm data to the halftoning module 33. The halftoning module 33 and the printing module 34 print patches in response to the CMYKlclm data. As the result, there are obtained color charts printed in response to each RGB data specified in the no color adjustment LUT 42. These color charts are measured for color by the colorimeter 50, and their Lab values are entered into the module 22 to generate the color-correcting LUT.

Also, the module 22 to generate the color-correcting LUT acquires the color values of sRGB data determined by the module 21 to determine the target Lab values. It performs such process as gamut mapping and interpolation and calculates RGB data (in the RGB color system to be used by the no color adjustment LUT 42) corresponding to the target's sRGB values. Moreover, it converts the acquired RGB data by means of the no color adjustment LUT 42, thereby acquiring the corresponding CMYKlclm data. It associates this CMYKlclm data with the sRGB data, thereby preparing the color-correcting LUT 41, and records it in the hard disc 13*b*.

(3) Smoothing Process

Figure 5:
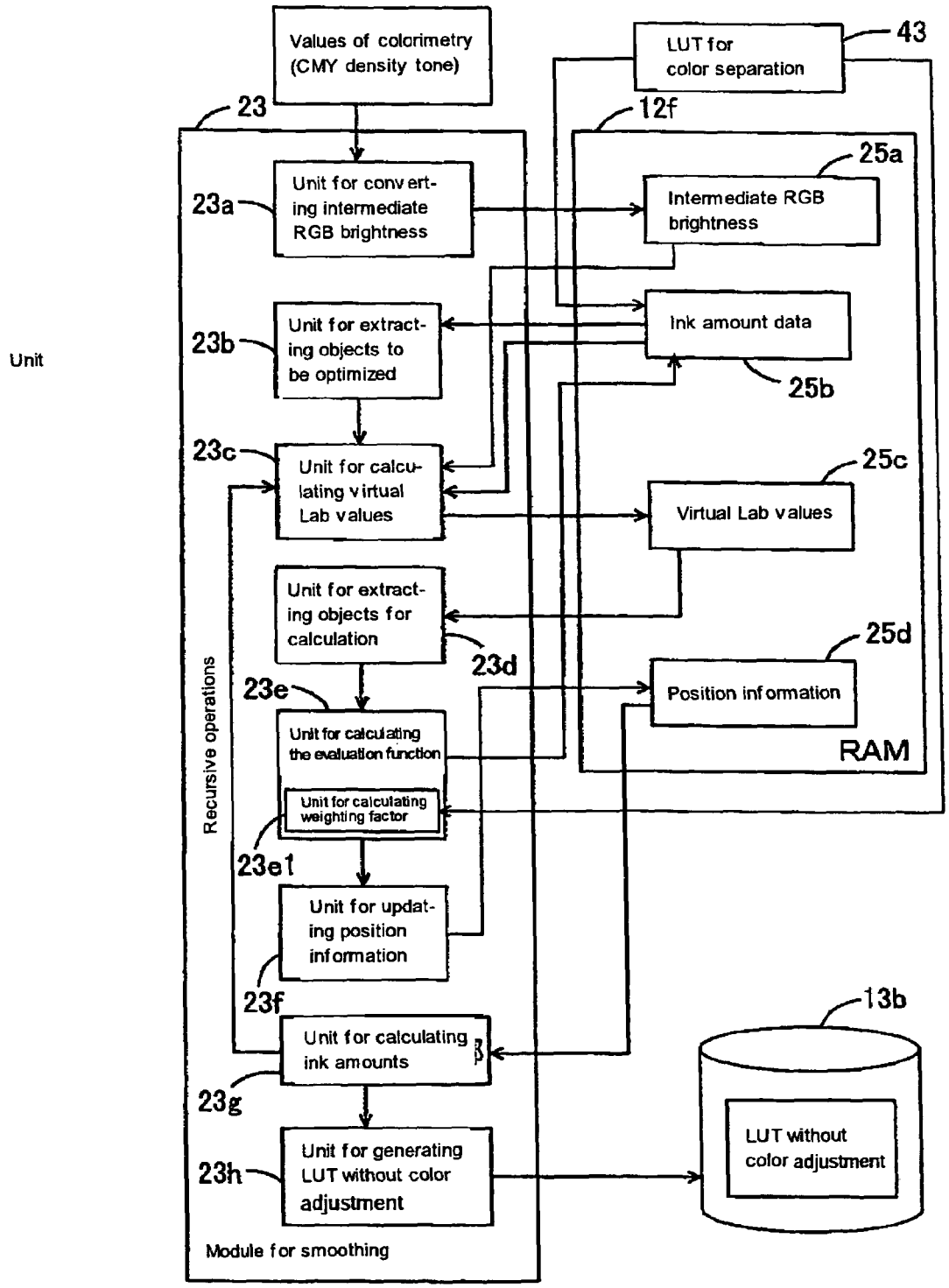
FIG. 5 is a block diagram showing the configuration of the smoothing module.
Figure 6:
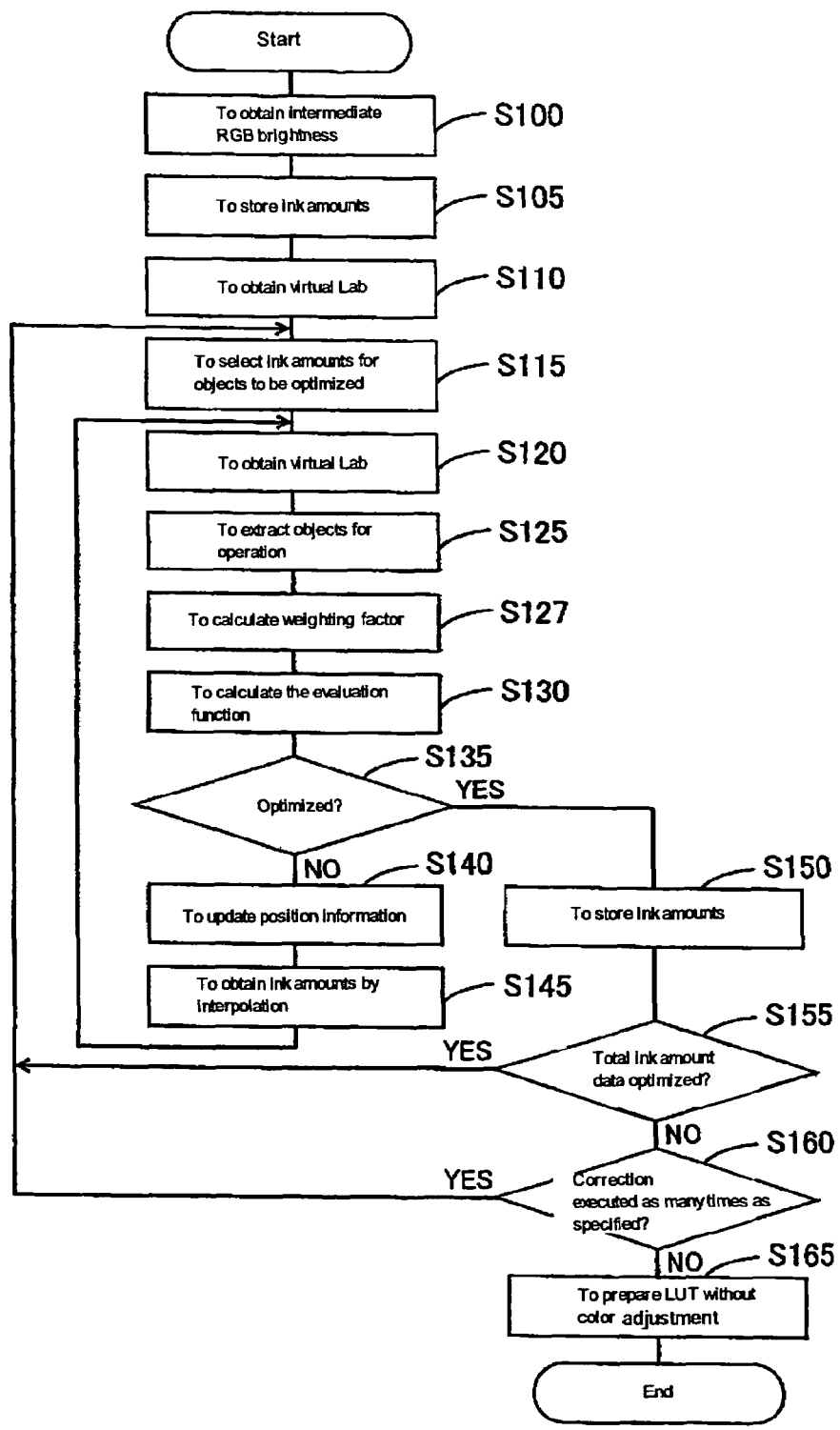
FIG. 6 is a flowchart for the smoothing procedure.

The above-mentioned smoothing process will be described in more detail in the following. FIG. 5 is a block diagram showing the construction of the smoothing module 23. FIG. 6 is a flowchart showing the process which is carried out by the smoothing module 23. The smoothing module 23 has the unit 23*a* for converting intermediate RGB brightness, the unit 23*b* for extracting objects to be optimized, the unit 23*c* for calculating virtual Lab values, the unit 23*d* for extracting objects for calculation, the unit 23*e* for calculating the evaluation function, the unit 23*f* for updating position information, the unit 23*g* for calculating ink amounts, and the unit 23*h* for generating no color adjustment LUT.

The unit 23*a* for converting intermediate RGB brightness is a unit which references the above-mentioned calorimetric value and converts them into intermediate RGB brightness by simple operation. In Step S100, the unit 23*a* for converting intermediate RGB brightness converts the calorimetric value 45 into intermediate RGB brightness and records the result of conversion, in terms of the value of intermediate RGB brightness 25a, in the RAM 12f. To be more specific, the smoothing module extracts about 16-32 gradation values from 256 gradations for each color of each ink color in CMYKlclm and then generates the image data that causes patches to be printed with each single color for the extracted gradation values and then outputs them to the halftoning module 33.

As the result, 16-32 patches are printed in single color for each color. The calorimeter 50 measures these patches and white paper (not printed with ink) so as to acquire the values of CMY density for each color. Here, if the value of CMY density does not increase or decrease monotonously for the change in gradation of each ink color, it does not converge into the optimal solution in the optimizing process mentioned later but it falls into the extremum solution; therefore, smoothing is carried out beforehand so that the value of CMY density for each color increases or decreases monotonously.

The unit 23a for converting intermediate RGB brightness substitutes the value of CMY density into the formula (1) below, thereby calculating the intermediate RGB brightness for each patch of each ink color.

$$\begin{cases} Tr_i = 10^{-Dc_i} \\ Tg_i = 10^{-Dm_i} \quad (i=1,\,,\,,6) \\ Tb_i = 10^{-Dy_i} \end{cases} \quad (1)$$

Incidentally, the formula (1) is a general formula to convert density into brightness; in this embodiment, the intermediate RGB brightness is obtained by regarding the CMY density as the independent variable for each color component. Here, Tr, Tg, Tb are referred to as intermediate RGB brightness, and they represent respectively the R brightness component, G brightness component, and B brightness component in each patch of each ink in single color. Also, Dc, Dm, Dy represent respectively the C density component, M density component, and Y density component, and i is a sign to distinguish ink colors.

The foregoing operation gives the intermediate RGB brightness for printing with the ink gradation value of each ink in single color. Therefore, if the correspondence between the intermediate RGB brightness and the ink gradation value of single color of each ink is referenced, it is possible to calculate the intermediate RGB brightness corresponding to the arbitrary gradation value of ink in single color by interpolation. By the foregoing processing, the intermediate RGB brightness is acquired and this value is recorded in the RAM 12f as the intermediate RGB brightness value 23a.

In this embodiment, the virtual Lab value is calculated as mentioned above, and the virtual Lab value is changed in the virtual Lab color space by regarding as the variable the position information of lattice points in the color-separating LUT. Then, the unit 23c for calculating virtual Lab values calculates from the intermediate RGB brightness the RGB brightness corresponding to CMYKlclm data in the color-separating LUT 43 and calculates the Lab values from this RGB brightness and records them in the RAM 12f as the virtual Lab values 25c. Incidentally, since this intermediate RGB brightness is calculated by a simple formula from the intermediate RGB brightness, this RGB brightness is referred to as the virtual RGB brightness in this specification.

To be concrete, in Step S105, the unit 23b for extracting objects to be optimized records the CMYKlclm data prescribed in the color-separating LUT 43 in the RAM 12f as the ink amount data 25b. In Step S110, the unit 23c for calculating virtual Lab values calculates the virtual RGB brightness corresponding to the color represented by CMYKlclm data (this color is in the state of combination of each ink color according to the formula (2) below) for the ink amount data 25b.

$$\begin{cases} R = \prod_{i=1}^{6} Tr_i \\ G = \prod_{i=1}^{6} Tg_i \\ B = \prod_{i=1}^{6} Tb_i \end{cases} \quad (2)$$

After the virtual RGB brightness has been calculated as mentioned above, the calculated virtual RGB brightness is converted into the value of the XYZ color system by the 3×3 matrix and the value of the XYZ color system is further converted into the value of the Lab color system. The converted virtual Lab value is the above-mentioned virtual Lab value 25c; in this stage, the virtual Lab value corresponding to the CMYKlclm data prescribed by the color-separating LUT 43 is recorded in the RAM 12f.

As mentioned above, in this embodiment, the virtual RGB brightness and the virtual Lab value corresponding to it are calculated by simple operation from a small number (say, about 16-32) of patches for each ink. Here, the number of data to be calculated is equal to the number of all the reference points prescribed in the color-separating LUT 43; however, the objects for colorimetry are 16-32 multiplied by the number of inks plus paper white, and their number is much smaller than the number of reference points; therefore, it is possible to carry out processing much faster than the case in which all colors are measured.

Also, after smoothing in this embodiment, the module 22 to generate the color-correcting LUT performs the processing which makes correspondence between the device-independent color and the RGB color (CMYKlclm data in its turn) in the no color adjustment LUT 42; therefore, it is not important in the smoothing process that the lattice points represent exactly correct colors. In other words, what is important is the degree of smoothness of the arrangement of lattice points. If the virtual Lab value is entirely different from the actual Lab value when the arrangement of lattice points is smoothed, then smoothing is nonsense; however, in this embodiment, the above-mentioned formulas (1) and (2) are based on the simplified Lambert-Beer's law, and hence there is no possibility that the virtual Lab value is entirely different from the actual Lab value. The present applicant's experiments revealed that the simple operation in this embodiment fully produces the effect of smoothing the arrangement of lattice points and that it is possible to prepare the color-correcting LUT that permits accurate color conversion.

Incidentally, the above-mentioned operation is merely an example; it is possible to calculate the above-mentioned virtual Lab value by various operations so long as it is close to the actual Lab value and the smoothing effect is fully produced. Colorimetry may be actually carried out if labor is not a problem. Selecting 16-32 gradations is also merely an example; the number of gradations may be smaller or larger than that. About 16-32 gradations generally give a good result. Moreover, gradations of patches for colorimetry may be selected variously; it is possible to select gradations uniformly, or alternatively, it is possible to select more of gradations with smaller values in view of the ink characteristics that the larger the gradation value, the smaller the degree of change in density. Of course, it is possible to change the way of selecting gradations for each color. It is also possible to calculate by interpolation the CMY density corresponding to the ink amount by referencing the gradation of CMY density obtained by colorimetry and then acquire the intermediate RGB brightness.

In this embodiment, smoothing is accomplished recursively for each lattice point by the RGB data of the color-separating LUT by utilizing the above-mentioned intermediate RGB brightness value $25a$, ink amount data $25b$, and virtual Lab value $25c$. In Step S115, the unit $23b$ for extracting objects to be optimized extracts the CMYKlclm data which has not yet undergone smoothing from a plurality of data recorded as the ink amount data $25b$ and extracts it as the object to be optimized. In Step S120, the unit $23c$ for calculating virtual Lab values calculates the virtual Lab values corresponding to the CMYKlclm data. In other words, it calculates the virtual Lab value corresponding to the CMYKlclm data to be optimized from the intermediate RGB brightness value $25a$ and the ink amount data $25b$.

Smoothing is accomplished by utilizing the virtual Lab values corresponding to the CMYKlclm data to be optimized and the virtual Lab values corresponding to the neighboring lattice points. So, in Step S125, the unit $23d$ for extracting objects for calculation extracts the virtual Lab values corresponding to the lattice points which are present around the Lab lattice points to be optimized and which are adjacent to said lattice points. Incidentally, the virtual Lab values to be extracted vary depending on the spatial position of the virtual Lab lattice points to be optimized. This will be described later in detail.

The unit $23e$ for calculating the evaluation function calculates the evaluation function by utilizing the lattice point to be optimized (extracted in Step S127 and Step S130) and its neighboring lattice points. The evaluation function is a function whose value becomes smaller as the arrangement of the virtual Lab lattice points to be optimized is smoothed. Its variable is the position information which specifies the position of RGB lattice point of the color-separating LUT 43. In other words if the position information is adjusted, the virtual Lab values to be optimized vary and the optimized position information (or the position information which minimizes the evaluation function) is obtained. Incidentally, the evaluation function varies in its form depending on the spatial position of the virtual Lab lattice points to be optimized, and the evaluation functions are prescribed which differ respectively depending on the edge line on the boundary of the color gamut, the outer plane, and the inside of the color gamut. In other words, evaluation functions of a plurality of function forms are previously set up and the evaluation functions are adequately changed according to the region of the color gamut to which the virtual Lab lattice points to be optimized belong.

In this embodiment, an additional term is added to the evaluation function so that the lattice points are hard to move as they are closer to the boundary of the above-mentioned region in order that the smoothness is high for the lattice points existing on the boundary of the above-mentioned region after the arrangement of lattice points has been smoothed even in the case where the evaluation function is described in terms of the function form which varies depending on the region of the color gamut to which the virtual Lab lattice points belong.

For this reason, the unit $23e$ for calculating the evaluation function is provided with the unit $23e1$ for calculating the weighting factor, which, in Step S127, calculates the weighting factor, which takes on a larger value as it approaches the boundary of the color gamut, for each color component of the low-dimensional color space. Also, the formula expressing for each color component the magnitude of difference between the position information before optimization and the position information of the object for optimization is multiplied by the weighting factor to give the additional term. In Step S130, the unit $23e$ for calculating the evaluation function calculates the evaluation function containing the above-mentioned additional term for each evaluation function. Since this embodiment employs the evaluation function which smoothes the arrangement of lattice points by the minimizing treatment, it is possible to make the lattice points hard to move as they approach the boundary of the above-mentioned region by causing the evaluation function to contain the additional term which takes on a larger value as they approach the boundary of the above-mentioned region.

To be concrete, when more than any one of the position information Pr, Pg, Pb is fixed at the minimum value or the maximum value and the other position information is made variable, it is possible to specify the color on the edge line and outer plane on the boundary of the color gamut by combining said position information. And, by prescribing the weighting factor which takes on a larger value at a position closer to the boundary of the color gamut for each color component of the low-dimensional color space, and by multiplying the formula expressing the magnitude of difference between the position information before optimization and the position information of the object for optimization for each color component by said weighting factor, it is possible to form the term which takes on a larger value at a position closer to the boundary of the above-mentioned region.

Moreover, the unit $23e$ for calculating the evaluation function calculates the value of the evaluation function calculated in Step S130 mentioned above, and in Step S135, it judges whether or not the calculated value is lower than a prescribed threshold value. In other words, when the value of the evaluation function is lower than the prescribed value, it judges that the position of the virtual Lab lattice point has been optimized (or sufficiently smoothed). If it is judged in Step S135 that the position of the virtual Lab lattice point is not optimized, the unit $23f$ for updating position information updates the optimized position information and records it in the RAM $12f$ as the position information $25d$.

The next step after the position information has been updated is to calculate again the evaluation function in order to judge whether or not the virtual Lab value to be optimized is optimized by the ink amount corresponding to the RGB lattice point specified by the position information. In other words, in Step S145, the unit $23g$ for calculating ink amounts references the position information $25d$ and calculates the ink amount data (CMYKlclm data) corresponding to the updated position information. At this time, it references the ink amount data $25b$ and calculates the ink amount corresponding to the position information which has been updated by interpolation.

If the ink amount corresponding to the updated position information is calculated as mentioned above, it is possible to calculate the updated virtual Lab value from the ink amount. Therefore, by repeating the process after Step S120, it is possible to converge the value of the evaluation function below the specific threshold value mentioned above and it is possible to optimize the position of the virtual Lab lattice point. That is, the arrangement of lattice points is converged to the optimal position by optimizing the position information by the evaluation function (or minimizing the evaluation function) and by repeating the process after Step S120 until the virtual Lab lattice point is optimized (or the arrangement of lattice points is smoothed). Incidentally, as a concrete algorithm for optimization, it is possible to adopt various algorithms such as quasi-Newton method and conjugate gradient method.

On the other hand, when it is judged that the position of the virtual Lab lattice point has been optimized in Step S135, the ink amount data 25b is overwritten by the ink amount corresponding to the virtual Lab value at the time of optimization in Step S150, and it judges in Step S155 whether or not optimization is completed for all of the ink amount data 25b. And, the process after Step S115 is repeated until it judges in Step S155 that optimization is completed for all the ink amount data 25b.

In addition, in Step S160, it judges whether or not correction has been executed as many times as previously determined and repeats the process after Step S115 until it is judged that correction has been repeated as many times as prescribed. In other words, by repeating correction as many times as prescribed, it is guaranteed that the result of the optimizing process becomes the true solution. Of course, it is acceptable if it is guaranteed that it is completely optimized as a whole in Step S160, it is possible to judge for the total ink amount whether or not the value of the evaluation function and its average value are lower than the prescribed threshold value. Also, various constitutions may be adopted, for example, it is possible to recognize that complete optimization has been achieved when the average value of the evaluation function is approximately equal to the (n−1)th correction and the nth correction.

After the arrangement of lattice points has been smoothed sufficiently as mentioned above, it is possible to associate the RGB data with the ink amount data indicating the smoothed color in the Lab color space by associating the ink amount data 25b with the RGB data specified in the LUT 43 for color separation. So, in Step S165, the unit 23h for generating no color adjustment LUT overwrites the CMYKlclm data prescribed in the color-separating LUT 43 with the ink amount data 25b, thereby generating the no color adjustment LUT 42 in which the arrangement of lattice points has been smoothed and recording it in the hard disc 13b.

As mentioned above, in this embodiment, it is not always the case that the components of each color of the ink amount or CMYKlclm data are directly adjusted. If CMYKlclm data is to be adjusted, it is necessary to make adjustment in such a way that the rule considered when the color-separating LUT 43 has been prepared is satisfied. In consideration of this rule, arbitrariness is low when the CMYKlclm data is adjusted, and it sometimes becomes difficult that the arrangement of lattice points is sufficiently smoothed. However, in this embodiment, CMYKlclm data is not adjusted directly, but rather, the position information is made to change and the virtual Lab lattice points are adjusted.

Therefore, it is not necessary to take into consideration the rule applied when the color-separating LUT 43 is prepared and hence the degree of freedom in moving the virtual Lab lattice points is large. As the result, it is possible to easily optimize the arrangement of the virtual Lab lattice points. On the other hand, in Step S145, the ink amount data corresponding to the lattice point in terms of the updated position information 25d is obtained by referencing the ink amount prescribed in the color-separating LUT or the ink amount after smoothing. Therefore, the rule applied when the color-separating LUT 43 is prepared is reflected without deviation from the combination of the ink amount in the color-separating LUT. Therefore, the no color adjustment LUT 42 to be prepared satisfies the rule applied when the color-separating LUT is prepared and the arrangement of lattice points is also smoothed. At the time of this smoothing, it is possible to prevent the lattice points near the boundary from moving individually for each region and to prevent smoothness decreasing at the boundary because the function form makes it difficult for the lattice points to move at the boundary for each region.

(4) Optimization by Means of Evaluation Function

Figure 7:
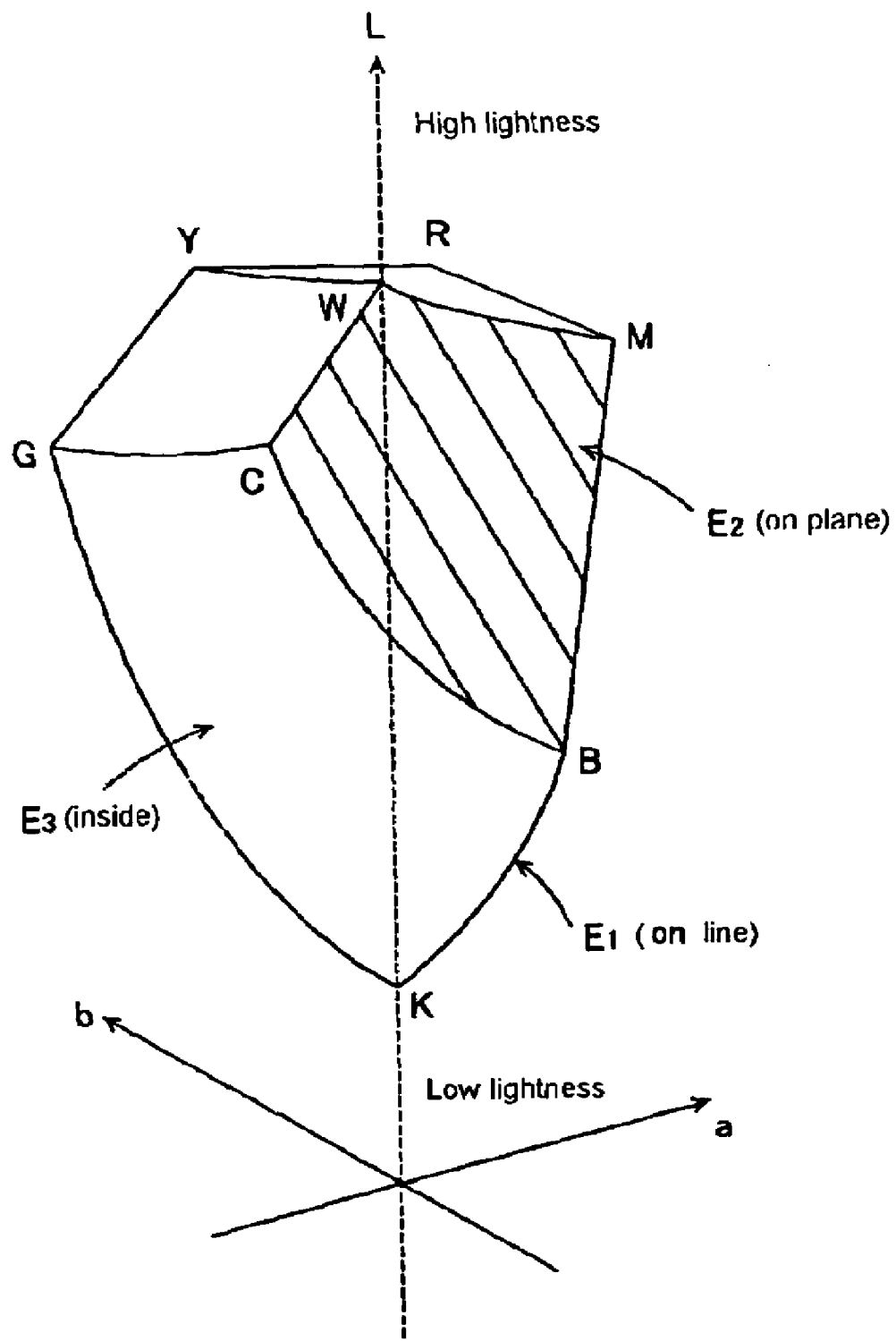
FIG. 7 is a schematic diagram showing the color gamut of the printer.

Next, the optimization by means of the evaluation function in Steps S120 to S140 will be described in detail in the following. FIG. 7 is a schematic diagram showing the color gamut of the printer 17c in the Lab color space. The color gamut of the printer 17c is distorted in the Lab color space, as shown in this figure. Also, since the virtual Lab value is close to the actual Lab value as mentioned above, the color gamut which the virtual Lab value forms has the same shape as the solid body shown in FIG. 7. On the other hand, when the color of an image is expressed in terms of the combination of RGB data in the color-separating LUT, the color gamut in the RGB color space which is formed such that the component of each of RGB constitute the axes of the orthogonal three-dimensional space takes on the cubic shape shown in the upper left part in FIG. 2.

The color gamut in the Lab color space has a distorted shape, but the boundary of that color gamut can be easily associated with the boundary of the color gamut in the RGB color space. That is, the boundary of the color gamut in the RGB color space consists of 12 edge lines and 6 planes forming the cubic body. The boundary of the color gamut in the Lab color space also consists of 12 edge lines and 6 planes. To be concrete, the color changes from K to B if the B component only has finite values along the edge line on the B axis from the origin in the RGB color space, with the R and G components fixed at the minimum values, and the colors in the Lab color space corresponding to these colors are on the edge line indicated by $E_1$ in FIG. 7.

Similarly, in the cubic body shown in the upper left part of FIG. 2, the apexes at the uppermost plane represent respectively BWCM (W=white). The colors on this plane may be expressed by fixing the B component only at the maximum value and varying other components arbitrarily. The colors on this plane are on the plane indicated by $E_2$ in the color gamut shown in FIG. 7. Therefore, it can be said that the color is on the boundary of the color gamut if any one of the RGB data of the color-separating LUT has the maximum or minimum value. If the color on this boundary of the color gamut is freely movable in the virtual Lab color space when the above-mentioned optimization is carried out, it would be impossible to secure the sufficient large color gamut. So, in this embodiment, in order to maintain the size of the color gamut, the evaluation function is acquired which differs in function form on the 12 edge lines formed at the boundary of the color gamut, on the 6 outer planes, and in the color gamut.

However, these evaluation functions are minimized individually. In other words, the lattice points to be optimized which exist on the edge line, the lattice points to be optimized which exist on the outer plane, and the lattice points to be optimized which exist inside the color gamut are independent from one another. Therefore, an additional term is added so that smoothness does not decrease at the boundary between the edge line and the edge line, the boundary between the edge line and the outer plane, the boundary between the edge line and the inside of the color gamut, the boundary between the outer plane and the outer plane, and the boundary between the outer plane and the inside of the color gamut, while the evaluation function is being minimized individually.

(4-1) Evaluation Function $E_1$

Figure 8:
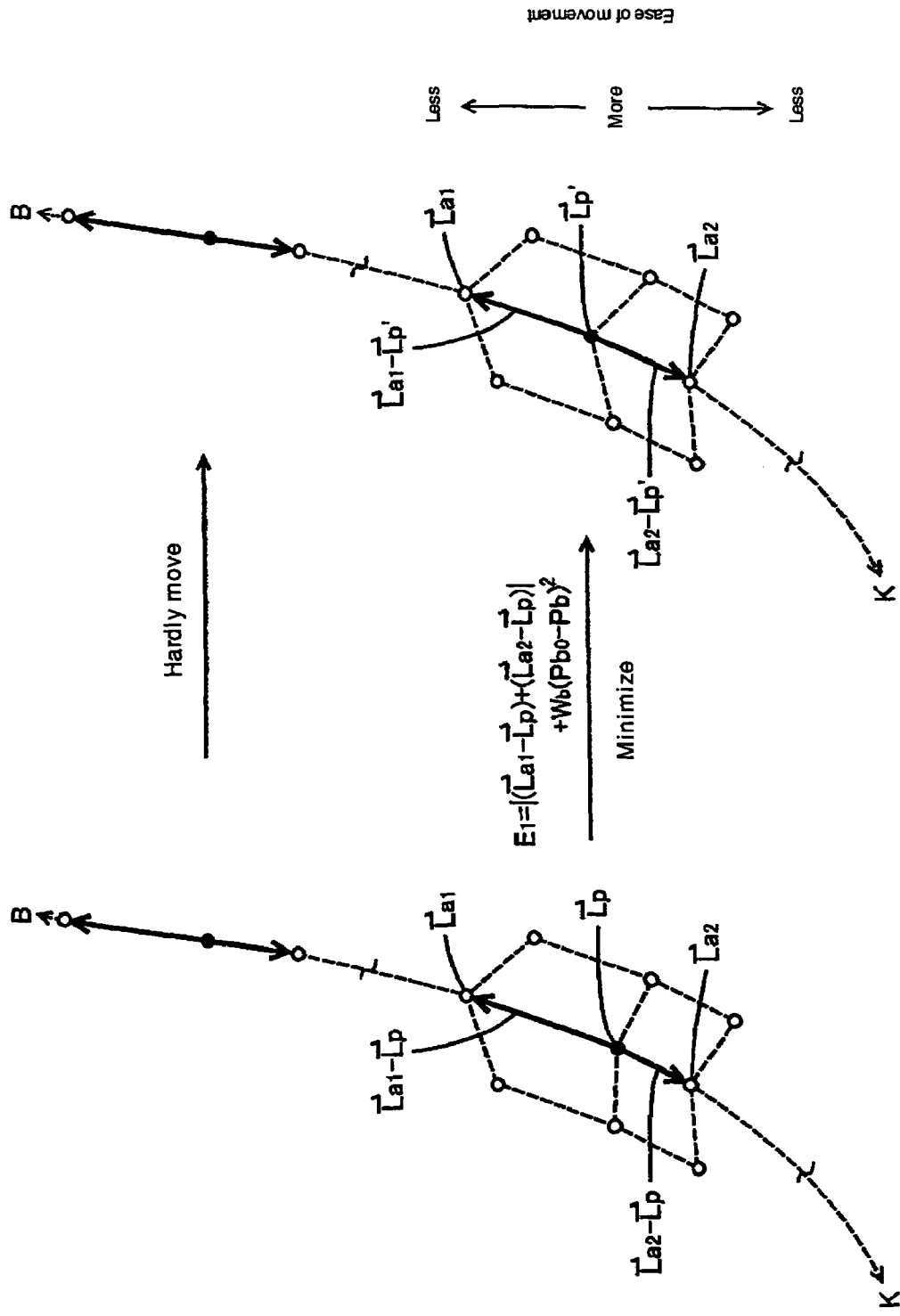
FIG. 8 is a diagram showing the evaluation function that optimizes the lattice point on the edge line.

FIG. 8 is a diagram that illustrates the evaluation function to optimize the lattice point on the edge line formed on the color gamut in the Lab color space. In this figure, the curves drawn with broken lines represent the edge lines formed on the boundary of the color gamut. The lattice point to be optimized is indicated by a black circle, and the neighboring lattice points are indicated by white circles. In order to maintain the size of the color gamut, it is necessary that the lattice point to be optimized (indicated by the black circle) should be on the edge line indicated by the broken line. So, in this embodiment, when the unit 23b for extracting objects to be optimized extracts the lattice point on the edge line indicated by the broken line as the object to be optimized, as shown in FIG. 8, the unit 23d for extracting objects for calculation extracts, as the lattice point for calculation, the lattice point which is adjacent to the lattice point to be optimized and present on the edge line indicated by the broken line.

In this figure, the lattice point to be optimized is denoted by the vector $L_p$, and the lattice points to be extracted by the unit 23d for extracting objects for calculation are denoted by the vectors $L_{a1}$ and $L_{a2}$. Here, the vector $L_p$ is calculated by the formula (3) below, and it is expressed in terms of the above-mentioned position information (Pr, Pg, Pb) as the variables. In this embodiment, the position information may be a variable which univocally specifies the virtual Lab value and a value that can specify the position of the RGB lattice point in the color-separating LUT.

$$\overline{L_P} = f(Pr, Pg, Pb) \quad (3)$$

Also, f in this formula is a function which obtains the virtual Lab vector from the position information (Pr, Pg, Pb). The function f is the formula for interpolation to calculate the ink amount corresponding to the position information (Pr, Pg, Pb) and the formula to calculate the virtual Lab value through the XYZ color system by the above-mentioned formula (2) and the above-mentioned matrix from the ink amount after said calculation.

The evaluation function utilizes these vectors $L_p$, $L_{a1}$, and $L_{a2}$ and calculates by the formula (4) shown below.

$$E_1 = |(\overline{L_{a1}} - \overline{L_P}) + (\overline{L_{a2}} - \overline{L_P})| + W_b(P_{b0} - P_b)^2 \quad (4)$$

where, $W_b$ is the weighting factor which takes on a larger value as the B component of the lattice point to be optimized in the color-separating LUT 43 departs from the middle point of the value range, and $P_{b0}$ is the current position information in the B direction. Incidentally, the second term including this weighting factor is calculated by the unit $23_{e1}$ for calculating the weighting factor.

In other words, the first term takes on a minimum value when the distance is equal and the direction is opposite between the lattice point to be optimized and the lattice points adjoining at both sides, and the value of the function become larger as the difference between the distances is larger and the direction deviates more from the opposite direction. If the lattice points are evenly arranged, the arrangement of lattice points tends to be smoothed; therefore, it can be said that the smaller the first term shown in Formula (4), the more the lattice points to be optimized is smoothed relative to the adjoining lattice points. On the other hand, the second term becomes minimum when the position information $P_b$ does not change but the weighting factor $W_b$ becomes larger as the B component of the lattice point to be optimized in the color-separating LUT 43 departs from the middle point of the value range, and consequently, the second term as a whole departs from the middle point of the value range and it becomes large when the position information $P_b$ changes.

Therefore, when $E_1$ is minimized, the influence of the first term becomes larger as the value of the B component of the lattice point to be optimized in the color-separating LUT 43 is closer to the middle point of the value range, and the influence of the second term becomes larger as the value of the B component is far away from the middle point of the value range. As the result, when $E_1$ is minimized, the original lattice point becomes hard to move as the value of the B component departs from the middle point of the value range. The situation in which the value of the B component is far from the middle point of the value range means that it is close to the end of the edge line indicated by a broken line in FIG. 8. Since the end of the edge line is close to the other edge line, if the lattice point near the end of the edge line is moved freely, smoothness might improve relative to the adjoining lattice points on the edge line BK, but there is the possibility that smoothness decreases relative to the lattice point on the other edge line. So, this embodiment is designed such that smoothing is achieved over the entire color gamut by adding the second term to the evaluation function.

Therefore, by minimizing the evaluation function $E_1$, it is possible to move comparatively freely the lattice point to be optimized near the center of the edge line BK, make even and smooth the arrangement relative to the adjoining lattice point, and acquire the vector $L'_p$, with the position of the lattice point of the vector $L_p$ optimized as shown in the right side of FIG. 8. On the other hand, the lattice point to be optimized near the end of the edge line BK does not move comparatively freely and the position of the lattice point is hard to change as shown in the upper right side of FIG. 8. However, smoothing is not performed only by considering the relation with the adjacent lattice point on the edge lien BK, and hence it is possible to prevent smoothness from decreasing relative to the lattice point on the other edge line.

Also, the vectors $L_p$, $L_{a1}$, and $L_{a2}$ are represented by the position information (Pr, Pg, Pb); however, in the evaluation function $E_1$, the position information that gives the vectors $L_{a1}$ and $L_{a2}$ is fixed and it is the position information (Pr, Pg. Pb) that gives the vector $L_p$, only one of them is variable and other two are fixed at the minimum value or maximum value. In the case shown in FIG. 8, the color on the edge line indicated by the broken line exists between B and K, and the position information Pr and Pg which specifies the lattice point of the LUT 43 for color separation corresponding to this color is a minimal value and the position information Pb is an arbitrary value. So, in order to move the lattice point in the Lab color space along this edge line, it is only necessary that the position information Pr and Pg be fixed at minimum and the Pb be variable.

As mentioned above, the possibility that smoothness decreases at the boundary between the edge line and the edge line is due largely to the fact that the fixed position information and the variable position information vary for each region in the color gamut. In other words, on the edge line of the above-mentioned boundary of the color gamut, two of the position information are fixed and one of the position information is variable, and on the outer plane of the boundary of the color gamut, one of the position information is fixed and two of the position information are variable, and inside the color gamut, three of the position information are variable. Also, if the edge line differs, the position information to be made variable also differs, and the position information to be made variable on the different outer plane differs.

Therefore, the constraint condition for the position information abruptly changes near the edge line and outer plane and inside the color gamut. As the constraint condition fluctuates abruptly, there is the possibility that discontinuity occurs in smoothness of the arrangement of lattice point because the freedom for movement of lattice point to smooth the arrangement of lattice point and freedom for the direction of movement are entirely different. However, in this embodiment, the ease with which the lattice point moves is controlled by the above-mentioned weighting factor, thereby preventing the constraint condition from abruptly changing; therefore, no continuity occurs in smoothness at the boundary of the color gamut.

Incidentally, the explanation herein is based on the example shown in FIG. 8; therefore, the weighting factor $W_b$ of the formula (4) above is the factor which takes on a larger value as the value of the B component of the lattice point to be optimized in the color-separating LUT 43 departs from the middle point of the value range. Consequently, if the position information Pb alone is made variable as in FIG. 8, or the lattice point to be optimized exists on the edge line from C to G on the boundary of the color gamut, the position information Pg is fixed at maximum, Pr is fixed at minimum, and Pb is made variable, and when the lattice point to be optimized exists on the edge line from M to R on the boundary of the color gamut, the position information Pr is fixed at maximum, Pg is fixed at minimum, and Pb is made variable, and when the lattice point to be optimized exists on the edge line from M to Y on the boundary of the color gamut, the position information Pr and Pg are fixed at maximum and Pb is made variable. In this case, the second term of the evaluation function $E_1$ becomes $W_b(Pb_0-Pb)^2$.

Of course, in the case where the position information Pr and Pb alone, other than the position information Pb, are made variable and the lattice point to be optimized is moved, the other weighting factors $W_r$ and $W_g$ are used. For example if the lattice point to be optimized exists on the edge line from K to P on the boundary of the color gamut, the position information Pg and Pb are fixed at minimum and Pr is made variable; if the lattice point to be optimized exists on the edge line from W to C on the boundary of the color gamut, the position information Pg and Pb are fixed at maximum and Pr is made variable; if the lattice point to be optimized exist on the edge line from M to B on the boundary of the color gamut, the position information Pb is fixed at maximum, Pg is fixed at minimum, and Pr is made variable; if the lattice point to be optimized exists on the edge line from Y to G on the boundary of the color gamut, the position information Pg is fixed at maximum, Pg is fixed at minimum, and Pr is made variable. In this case, the second term of the evaluation function $E_1$ becomes $W_r(Pr_0-P_r)^2$.

If the lattice point to be optimized exists on the edge line from K to G on the boundary of the color gamut, the position information Pr and Pb are fixed at minimum and Pg is made variable; if the lattice point to be optimized exists on the edge line from W to M on the boundary of the color gamut, the position information Pr and Pb are fixed at maximum and Pg is made variable; if the lattice point to be optimized exist on the edge line from C to B on the boundary of the color gamut, the position information Pb is fixed at maximum, Pr is fixed at minimum, and Pg is made variable; if the lattice point to be optimized exists on the edge line from Y to R on the boundary of the color gamut, the position information Pr is fixed at maximum, Pb is fixed at minimum, and Pg is made variable. In this case, the second term of the evaluation function $E_1$ becomes $W_g(Pg_0-P_g)^2$.

The weighting factor may be in any form so long as it takes on a larger value as the lattice point to be optimized in the color-separating LUT 43 departs from the middle point of the value range; in this embodiment, it is defined as follows. That is, in this embodiment, the range of values of RGB data in the color-separating LUT is 0~255, then it is possible to represent by the absolute value the value which becomes larger as the distance from the middle point of the value range of RGB data becomes larger. For example, for the R component, it is possible to judge whether or not it is close to the boundary of the color gamut in terms of the absolute value |R−127.5|. So, by considering other color components in the same way, the weight corresponding to the degree of closeness to the boundary of the color gamut is defined by the formula (5) below.

$$\begin{cases} Wr = k_{wr}\left(\dfrac{|R-127.5|}{127.5}\right)^{\gamma_{wr}} \\ Wg = k_{wg}\left(\dfrac{|G-127.5|}{127.5}\right)^{\gamma_{wg}} \\ Wb = k_{wb}\left(\dfrac{|B-127.5|}{127.5}\right)^{\gamma_{wb}} \end{cases} \quad (5)$$

Incidentally, $k_{wr}$, $k_{wg}$, and $k_{wb}$ denote respectively the factor that determines the magnitude of each weight. They should be sufficiently large so that each position information does not fluctuate at the boundary of the color gamut. And, $\gamma_{wr}$, $\gamma_{wg}$, and $\gamma_{wb}$ denote respectively the factors that adjust the degree of change of the magnitude of weight. By adjusting these factors, it is possible to change the weight according to the RGB data in the color-separating LUT. It is possible to make adjustment, such as making it large, when it is desirable to perform sufficient optimization without excessive weight in the vicinity of the center of the color gamut.

As mentioned above, if the evaluation function is made minimum by adequately changing the position information which is changed according to the position of the lattice point to be optimized, the position information that minimizes the evaluation function $E_1$ at that time is calculated, and by repeating this process it is possible to acquire the vector $L'_p$, with the lattice point optimized. In the thus obtained lattice point, freedom for movement is higher as it departs from the end of the edge line and hence smoothness is high relative to the adjacent lattice point, and freedom for movement is smaller as it approaches the end of the edge line, but smoothness does not decrease for the lattice point which exist at the end of the edge line, and therefore, it is possible to make very high smoothness of the color gamut as a whole.

(4-2) Evaluation Function $E_2$

Figure 9:
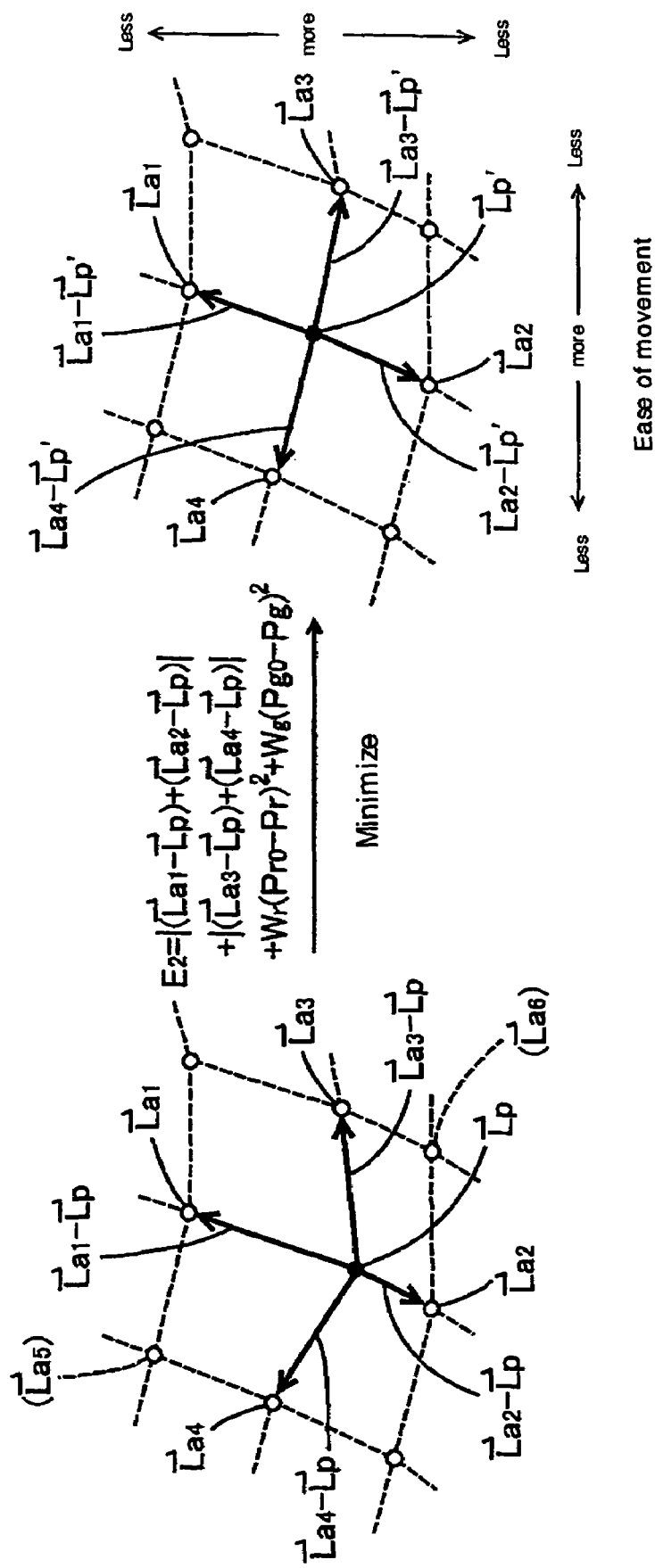
FIG. 9 is a diagram showing the evaluation function that optimizes the lattice point on the outer plane.

FIG. 9 is a diagram that illustrates the evaluation function to optimize the lattice point on the outer plane formed by the boundary of the color gamut in the Lab color space. In this figure, each broken line is a straight line that connects lattice points with each other. These lattice points exist on the outer plane formed by the boundary of the color gamut, and hence it follows that the other lattice points exist either behind or in front of the paper. The lattice point to be optimized is indicated by the black circle, and its neighboring lattice points are indicated by the white circles. In order to maintain the size of the color gamut, the lattice point to be optimized is not allowed to greatly move in the vertical direction with respect to the outer plane on which the lattice points indicated by the black and white circles exist. So, in this embodiment, when the unit 23b for extracting objects to be optimized has extracted the lattice point existing on the outer plane formed by the boundary of the color gamut, which is indicated by the black circle in FIG. 9 as the object to be optimized, it extracts as the lattice points for operation four lattice points which are adjacent to the lattice point to be optimized and exist on the outer plane formed by the boundary of the color gamut.

In this figure, the lattice point to be optimized is denoted by the vector $L_p$, and the lattice points to be extracted by the unit 23d for extracting objects for calculation are denoted by the vectors $L_{a1}$ to $L_{a4}$. Here, the vector $L_p$ is calculated by the formula (3) above, and it is expressed in terms of the above-mentioned position information (Pr, Pg, Pb) as the variables. The evaluation function to optimize the lattice points existing on the outer plane formed by the boundary of the color gamut utilizes the vector $L_p$ and these vectors $L_{a1}$ to $L_{a4}$ and is expressed by the formula (6) shown below.

$$E_2 = |(\overline{L_{a1}} - \overline{L_p}) + (\overline{L_{a2}} - \overline{L_p})| + |(L_{a3} - \overline{L_p}) + (\overline{L_{a4}} - \overline{L_p})| + W_r(P_{r0} - P_r)^2 + W_g(P_{g0} - P_g)^2 \quad (6)$$

Here, too, $W_r$ is the weighting factor which takes on a larger value as the R component of the lattice point to be optimized in the color-separating LUT 43 departs from the middle point of the value range, and $W_g$ is the weighting factor which takes on a larger value as the G component of the lattice point to be optimized in the color-separating LUT 43 departs from the middle point of the value range. Also, the first and second terms are calculated by the unit 23e for calculating the evaluation function, and the third and fourth terms are calculated by the unit 23e1 for calculating the weighting factor, according to the formula (5) above.

Moreover, the vector $L_p$ and vectors $L_{a1} \sim L_{a4}$ are represented by the position information (Pr, Pg, Pb); however, in the evaluation function $E_2$, the position information that gives the vector $L_p$ is the position information (Pr, Pg, Pb), only two of them are variable and other one is fixed at the minimum value or maximum value. The formula (6) is an example in which the lattice point to be optimized is on the outer plane WMBC of the boundary of the color gamut indicated by hatching in FIG. 7.

The color on the outer plane is the color in the case where the B component is maximum and the G component is varied arbitrarily. The position information Pb to specify the lattice point in the color-separating LUT 43 corresponding to this color is a maximum value and the position information Pr and Pg are arbitrary values. So, in order to move the lattice point in the Lab color space on the outer plane WMBC, it is only necessary to fix the position information Pb maximum and make Pr and Pg variable. For this reason, the weighting factors by which the third and fourth terms are multiplied are $W_r$ and $W_g$. The third and fourth terms of the evaluation function $E_2$ produce a remarkable effect of making larger the value of the evaluation function when the lattice point is moved if the lattice point to be optimized is closer to the edge of the outer plane on the color gamut. The first and second terms of the evaluation function $E_2$ make the evaluation function to take on smaller values as the distance of vectors orienting in the mutually opposite direction is equal from the lattice point to be optimized and the direction is closer to the exactly opposite direction.

Also, the arrangement of lattice points tends to be smoothed as the line connecting the adjoining lattice points (the line passing through the lattice points indicated by vector $L_{a1}$~vector $L_p$~vector $L_{a2}$ in FIG. 9) is close to a straight line and the lattice points are arranged more uniformly. Therefore, by minimizing $E_2$ represented by the formula (6), as the lattice point is far from the edge of the outer plane, the lattice points are arranged uniformly on the outer plane, and it is possible to acquire the vector $L'_p$, with the position of the lattice point of the vector $L_p$ optimized as shown in the right side of FIG. 9. Moreover, the lattice point close to the edge of the outer plane is hard to move, it does not decrease smoothness relative to the lattice point on the other outer plane.

In the formula (6) above, the weighting factor of the third and fourth terms are the values relating to the R component and G component. Of course, in the evaluation function $E_2$, the position information (Pr, Pg, Pb) to be made variable according to the lattice point to be optimized varies, and hence the weighting factors of the third and fourth terms are adequately selected from $W_r$, $W_g$, and $W_b$ according to the component of the position information that is variable.

That is, the color on the outer plane MRKB of the boundary of the color gamut is the color of the case in which the G component is minimum and the R and B components are arbitrarily changed. If the position information Pg is fixed at a minimum value and Pr and Pb are made variable, it is possible to move the lattice point to be optimized on the above-mentioned outer plane MRKB. Then, $W_r(Pr_0 - Pr)^2$ and $W_b(Pb_0 - Pb)^2$ are accepted as the third and fourth terms.

The color on the outer plane RYGK of the boundary of the color gamut is the color of the case in which the B component is minimum and the R and G components are arbitrarily changed. If the lattice point to be optimized is on this outer plane, the position information Pb is fixed at a minimum value and Pr and Pg are made variable, and $W_r(Pr_0 - Pr)^2$ and $W_g(Pg_0 - Pg)^2$ are accepted as the third and fourth terms. The color on the outer plane YWCG of the boundary of the color gamut is the color of the case in which the G component is maximum and the R and B components are arbitrarily changed. If the lattice point to be optimized is on this outer plane, the position information Pg is fixed at a maximum value and Pr and Pb are made variable, and $W_r(Pr_0 - Pr)^2$ and $W_b(Pb_0 - Pb)^2$ are accepted as the third and fourth terms.

The color on the outer plane WYRM of the boundary of the color gamut is the color of the case in which the R component is maximum and the G and B components are arbitrarily changed. If the lattice point to be optimized is on this outer plane, the position information Pr is fixed at a maximum value and Pg and Pb are made variable, and $W^g(Pg_0 - Pg)^2$ and $W_b(Pb_0 - Pb)^2$ are accepted as the third and fourth terms. The color on the outer plane CGKB of the boundary of the color gamut is the color of the case in which the R component is minimum and the G and B components are arbitrarily changed. If the lattice point to be optimized is on this outer plane, the position information Pr is fixed at a minimum value and Pg and Pb are made variable, and $W^g(Pg_0-Pg)^2$ and $W_b(Pb_0-Pb)^2$ are accepted as the third and fourth terms.

As mentioned above, if the position information to be varied according to the position of the lattice point to be optimized is selected and the evaluation function $E_2$ is minimized, the position information that minimizes the evaluation function at that time is calculated, and by repeating this process, it is possible to acquire $L'_p$, with the position of the lattice point optimized. In the thus obtained lattice point, freedom for movement is higher as it is away from the edge of the outer plane, and hence smoothness is high relative to the adjacent lattice point, and freedom for movement is small as it is close to the edge of the outer plane; however, there is no possibility that the lattice points existing on the other outer plane or edge line do not decrease smoothness, and hence it is possible to make very high the smoothness of the color gamut as a whole.

(4-3) Evaluation Function $E_3$

Figure 10:
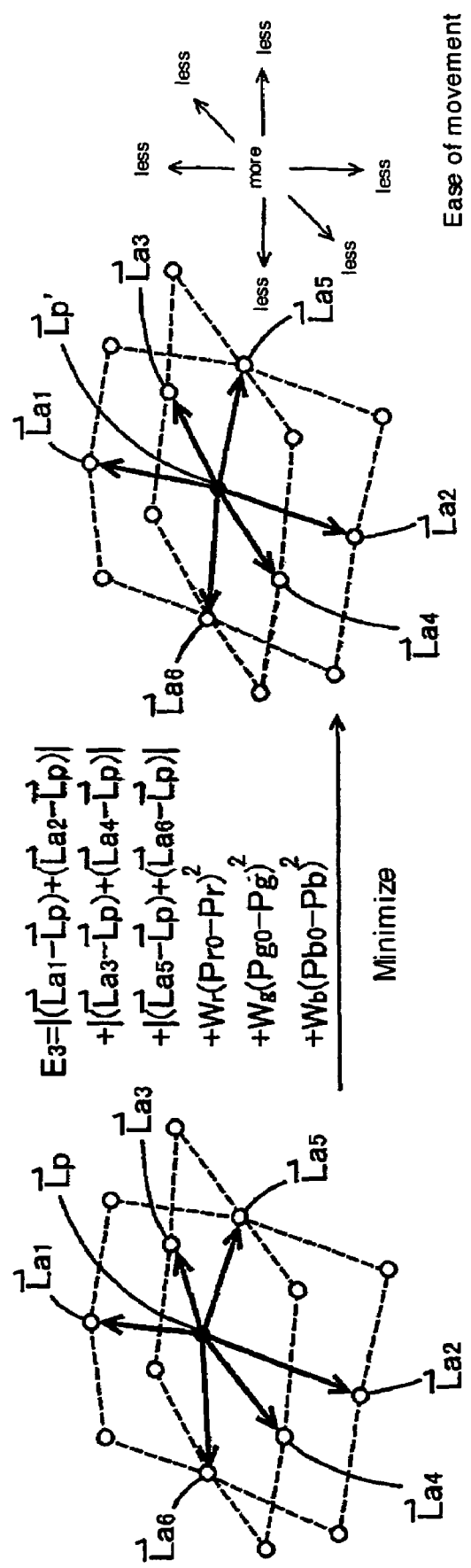
FIG. 10 is a diagram showing the evaluation function that optimizes the lattice point inside the color gamut.

FIG. 10 is a diagram that illustrates the evaluation function to optimize the lattice point existing inside except for the boundary of the color gamut in the Lab color space. In this figure, each broken line is a straight line that connects a plurality of lattice points with each other. These lattice points exist on the plane which is formed when the color gamut is cut in two directions. The lattice point to be optimized is indicated by the black circle, and its neighboring lattice points are indicated by the white circles. In this embodiment, the lattice points inside the color gamut are moved without imposing conditions to maintain the size of the color gamut. So, in this embodiment, when the unit 23b for extracting objects to be optimized has extracted the lattice point existing inside the color gamut, which is indicated by the black circle in FIG. 10 as the object to be optimized, it extracts as the lattice points for operation six lattice points which are adjacent to the lattice point to be optimized in six directions.

In this figure, the lattice point to be optimized is denoted by the vector $L_p$, and the lattice points to be extracted by the unit 23d for extracting objects for calculation are denoted by the vectors $L_{a1}$ to $L_{a6}$. Here, the vector $L_p$ is calculated by the formula (3) above, and it is expressed in terms of the above-mentioned position information (Pr, Pg. Pb) as the variables. The evaluation function to optimize the lattice points existing inside the color gamut utilizes the vector $L_p$ and these vectors $L_{a1}$ to $L_{a6}$ and is expressed by the formula (7) shown below.

$$E_3 = |(\vec{L_{a1}} - \vec{L_p}) + (\vec{L_{a2}} - \vec{L_p})| + |(\vec{L_{a3}} - \vec{L_p}) + (\vec{L_{a4}} - \vec{L_p})| + \\ |(\vec{L_{a5}} - \vec{L_p}) + (\vec{L_{a6}} - \vec{L_p})| + \\ W_r(P_{r0} - P_r)^2 + W_g(P_{g0} - P_g)^2 + W_b(P_{b0} - P_b)^2 \quad (7)$$

Here, too, each of $W_r$, $W_g$, and $W_b$ is the weighting factor which takes on a larger value as the values of the RGB components of the lattice point to be optimized in the color-separating LUT 43 departs from the middle point of the value range. Also, the first to third terms are calculated by the unit 23e for calculating the evaluation function, and the fourth to sixth terms are calculated by the unit 23e1 for calculating the weighting factor, according to the formula (5) above. In the evaluation function $E_3$, all of the position function (Pr, Pg, Pb) that give the vector $L_p$ are made variable.

The fourth to sixth terms of the evaluation function E3 produce a remarkable effect of making larger the value of the evaluation function when the lattice point is moved if the lattice point to be optimized is closer to the boundary of of the color gamut. The first and second terms of the evaluation function $E_3$ make the evaluation function to take on smaller values as the distance of vectors orienting in the mutually opposite direction is equal from the lattice point to be optimized and the direction is closer to the exactly opposite direction. When the line connecting adjacent lattice points is closer to a straight line (the line that passes through the lattice points indicated by vector $L_{a1}$~vector $L_p$~vector $L_{a2}$ in FIG. 10), or when the lattice points are more evenly arranged, the arrangement of lattice points tends to be smoothed. Therefore, by minimizing $E_3$ shown in Formula (6), it is possible to acquire the vector $L'_p$, with the lattice points arranged evenly and the lattice point of the vector $L_p$ optimized as shown in the right side of FIG. 10, according as the lattice point is far from the boundary of the color gamut. Also, since the lattice point near the boundary of the color gamut is hard to move, there is no possibility of decreasing smoothness relative to the lattice point on the other outer plane.

(5) Another Embodiment

Figure 11:
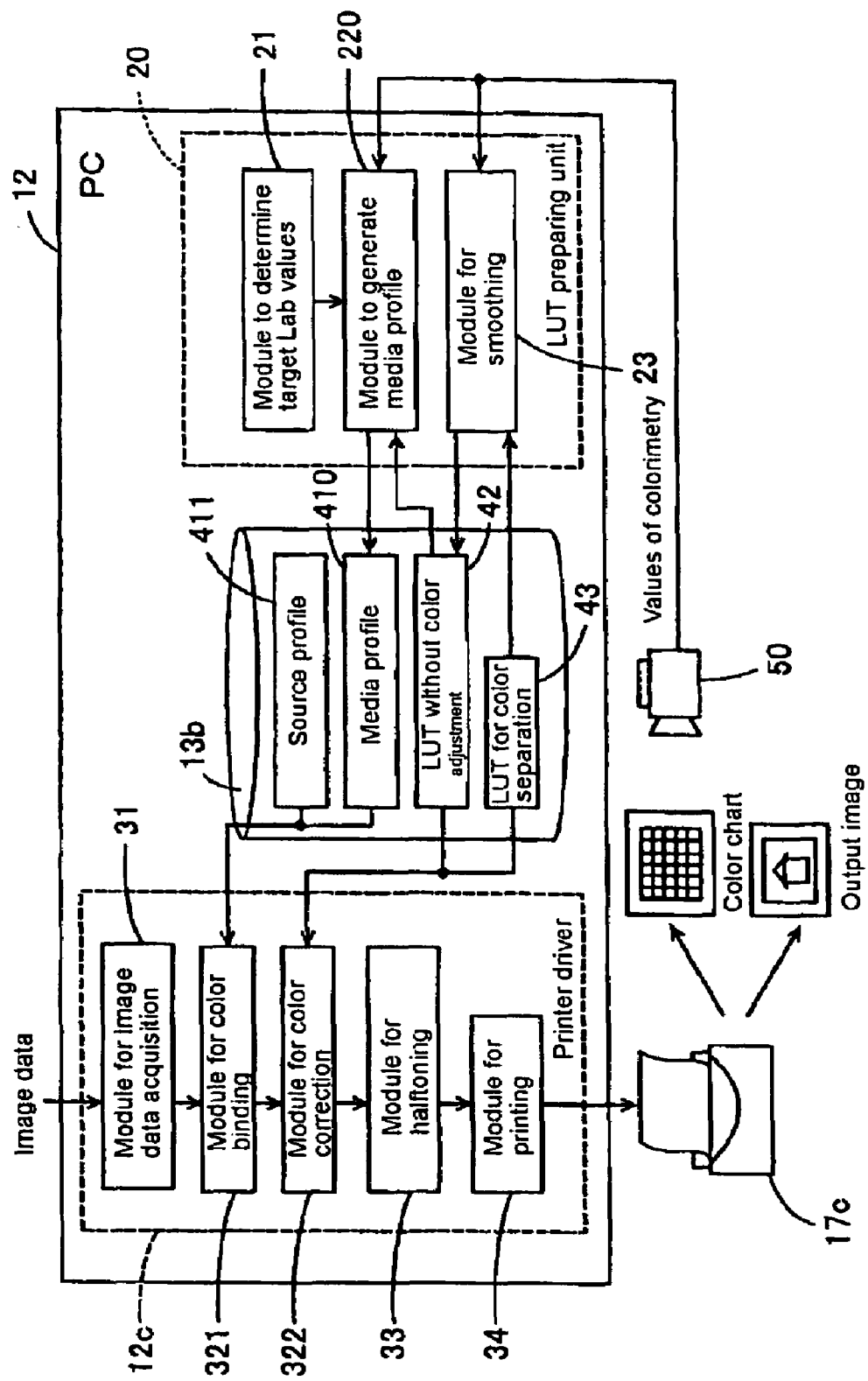
FIG. 11 is a block diagram of a program which is executed in another embodiment.

The above-mentioned embodiment is merely one example, and it is possible to accept other constitutions so long as they permit accurate color conversion by performing the smoothing process. FIG. 11 is a block diagram of the constitution in which the smoothing process according to the present invention is applied to the apparatus that carries out printing by using the profile prescribed by the ICC profile. In this figure, the same symbols are used for the same constitution in FIG. 4. In the ICC profile, it is necessary to previously get ready the source profile that transforms the color component values to be used by the image input device (such as display) into the coordinate values (such as Lab values) in the device-independent color space and the media profile that transforms the coordinate values in the device-independent color space into the color component values to be used by the image output device (such as printer).

And, it references the source profile, thereby converting the color defined by the input image data once into the coordinate values in the device-independent color space, and then references the media profile, thereby converting the coordinate values in the device-independent color space into the color component values to be used by the printer. The color component value references the no color adjustment LUT, thereby converting the color defined by the input image data into the color component value to be used by the printer. In this way, it is possible to execute printing with accurate conversion of image data color. Incidentally, in this embodiment, the media profile is prepared such that the color defined by the input image data agrees with the color defined by the color component value to be used by the printer.

To be concrete, the first step is to previously record in the hard disc 13b the source profile 411 and the color-separating LUT 43. The no color adjustment LUT 42 and the media profile 410 are prepared from the color-separating LUT 43. In other words, the module 23 for smoothing process, like the module shown in FIG. 4, performs smoothing process by referencing the color-separating LUT 43 and prepares the no color adjustment LUT 42. The media profile generating module 220 generates the media profile 410 by Lab→RGB conversion from color measurement shown in FIG. 1 on the basis of the no color adjustment LUT 42, the calorimetric value output by the colorimeter 50, and the Lab value output by the module 21 for determining the target Lab value. As the result, when the output RGB of the media profile 410 is converted by the no color adjustment LUT 42, it is possible to acquire the CMYKlclm data equivalent to the color defined by the Lab value entered into the media profile 410.

In the embodiment shown in FIG. 11, the printer driver 12c has the module for color binding 321 and the module for color correction 322. These modules 321 and 322 convert the color of the input image into the CMYKlclm data corresponding to the ink color to be used by the printer. The module for color binding 321 is a module which references the source profile 411 and the media profile 410, thereby converting the RGB colors of the input image data into the RGB values in the RGB color system which is prescribed in the no color adjustment LUT 42.

In other words, the source profile 411 is a profile which converts the color system of the input image data into the Lab color system; the module for color binding 321 references the source profile 411 to represent the color of input image data in terms of Lab values. The media profile 410 is a profile which converts the Lab color system into the RGB value in the RGB color system prescribed in the no color adjustment LUT 42. The module for color binding 321 references the media profile 410, thereby converting the Lab value into the RGB value. This RGB value is entered into the module for color correction 322.

The module for color correction 322 is a module which references the LUT, thereby performing color conversion. It references the no color adjustment LUT 42, thereby converging the RGB value entered into the CMYKlclm data. The thus obtained CMYKlclm data is entered into the halftoning module 33 and the printing module 34, so that the printer 17c prints the image defined by the image data. The media profile 410 is prepared from the no color adjustment LUT 42 after smoothing process as mentioned above. Even in this case, when the media profile 410 is prepared, interpolation is carried out as in the first embodiment mentioned above. Therefore, by smoothing the color-separating LUT 43, it is possible to improve the accuracy of interpolation, to particularly and locally improve the accuracy of interpolation according to need, and to prevent inaccurate operation from occurring locally due to ink properties at the time of interpolation. Therefore, in this embodiment, too, it is possible to execute printing by performing accurate color conversion.

Incidentally, in the above-mentioned two embodiments, the same PC functions as a printer driver (or a print-controlling apparatus) and also as an apparatus to prepare the LUT. Of course, it is possible to use separate PCs for these functions. In other words, if the color-correcting LUT, the media profile, and the no color adjustment LUT are previously prepared by using a PC capable of executing the unit for preparing the LUT, and the color-correcting LUT, the media profile, and the no color adjustment LUT which are thus prepared are transferred to another PC capable of controlling the printer by means of the printer driver, it is possible to realize each of them by individual PCs.

Also, in the above-mentioned printer 17c it was possible to mount six color inks of CMYKlclm; however, it is permissible to increase the number of colors by adding DY (dark yellow) or to decrease the number of colors by omitting lclm. It is also possible to mount six color inks of CMYKRV by using other colors, for example, R (red) and V (violet).

Moreover, in the above-mentioned evaluation function, it is permissible to adopt a function that increases in value when the degree of smoothness of the arrangement of lattice points in the virtual Lab color space decreases, and various functions other than mentioned above can be adopted. For example, in the above-mentioned evaluation functions $E_2$ and $E_3$, only the lattice points for which the vector is orthogonal when the lattice point forms the cubic lattice are extracted as the neighboring lattice points to be optimized. Selection in this manner is not always essential. For example, the evaluation function may be the one which includes the lattice point at the orthogonal position when the lattice points like vectors $L_{a5}$ and $L_{a6}$ in FIG. 9 form the cubic lattice. Such a lattice point at the orthogonal position is at the orthogonal position also in the RGB space, and particularly, the orthogonal axis of R=G=B corresponds to the gray axis. Therefore, if the degree of smoothness of the arrangement increases also for the lattice point at the orthogonal position, it is possible to prevent the occurrence of tone jump at the time of monochrome output.

In addition, in the above-mentioned embodiments, the sum of vectors in the opposite directions is taken so that the evaluation function has a small value for the arrangement of lattice points with a high degree of smoothness. Of course, other constitutions may be adopted. For example it may be a function which evaluates whether or not the relative positional relation between lattice points is similar. To be concrete, if a difference between vector $L_{a5}$–vector $L_{a4}$ and vector $L_{a1}$–vector $L_p$ in FIG. 9 is taken, the difference vector of the two vectors or (vector $L_{a5}$–vector $L_{a4}$)–(vector $L_{a1}$–vector $L_p$) is obtained. It can be said that the smaller the difference vector, the more similar the relative positional relation between the lattice points. Therefore, by adding the difference between (vector $L_{a1}$–vector $L_p$) and the neighboring vectors, it is possible to acquire the evaluation function that evaluates the degree of smoothness of the arrangement.

Moreover, in the above-mentioned evaluation function, the difference between vectors in the opposite direction with respect of the lattice point to be optimized as the center is taken and these differences are summed up. In other words, the state in which all the lattice points are uniform in the virtual Lab color space is regarded as ideal. However, in the case where the lattice points formed in the RGB space by RGB data of the color-separating LUT are originally non-uniform, or in the case where it is desirable to make intentionally nonuniform the distance between lattice points in the virtual Lab color space, the evaluation function may be changed. The instance which is regarded as optimal if the lattice points are nonuniform can be realized by adding a weighting variable to the evaluation function as shown in the formula (8) below.

where $W_1$ and $W_2$ are the weighting factors.

$$E_1 = |W_1(\overline{L_{a1}} - \overline{L_p}) + W_2(\overline{L_{a2}} - \overline{L_p})| + Wr(Pr_0 - Pr)^3 \qquad (8)$$

In other words, if $W_1 > W_2$ in the formula (8), it is possible to make small the value of the evaluation function $E_1$ in the state that the magnitude of vector $L_{a1}$–vector $L_p$ is smaller than the magnitude of vector $L_{a2}$–vector $L_p$, and the state in which the lattice point to be optimized is close to one of the lattice points is optimal. It is possible to accept various weighting factors. In the case where the arrangement of lattice points is by nonuniform intervals, it is possible to determine the weighting factor, for example, according to the formula (9) below.

$$\begin{cases} W_1 = \dfrac{D_2}{D_1 + D_2} \\ W_2 = \dfrac{D_1}{D_1 + D_2} \end{cases} \quad (9)$$

where, $D_1$ and $D_2$ are distances in the RGB color space. $D_1$ denotes the distance between the RGB lattice point in the LUT for color separation that gives the virtual Lab vector $L_{a1}$ and the RGB lattice point in the LUT for color separation that gives the vector $L_p$. $D_2$ denotes the distance between the RGB lattice point in the color-separating LUT that gives the virtual Lab vector $L_{a2}$ and the RGB lattice point in the color-separating LUT that gives the vector $L_p$. Needless to say, the formula (9) is merely one example. By designing another weighted evaluation function, it is possible to control the distance between lattice points in the virtual Lab color space by means of the lattice points which the RGB data of the LUT for color separation constitute or by locally increasing the density of lattice points in the virtual Lab color space according to a specific intention. Moreover, in the case of the above-mentioned evaluation functions $E_2$ and $E_3$, too, it is possible to easily control the intervals of the lattice points by setting the weight in the same way as above.

The embodiment in which the intervals of lattice points in the virtual color space are controlled by designing the weighted evaluation function is useful in the case where the intervals of lattice points are made nonuniform according to the ink characteristics or in the case where the number of lattice points is increased at a low ink recording ratio in consideration of the ink characteristics that the degree of change in density decreases as the ink recording ratio increases. Moreover, the embodiment in which the density of lattice points is locally increased in the virtual Lab color space by designing the weighted evaluation function is useful in the case where it is desirable to locally improve the accuracy of color conversion.

Although the present invention has been described and illustrated in detail, it is clearly understood that the same is by way illustration and example only and is not to be taken by way of limitation, the spirit and scope of the present invention being limited only by the terms of the appended claims.

What is claimed is:

1. A method for determining lattice points to be referenced to prepare correspondence defining data that defines correspondence between the amount of each ink used by the printing apparatus and the color component value in a color system, said method comprising:

referencing the original correspondence defining data which previously prescribes correspondence between the lattice points in the low-dimensional color space prescribed by less color components than the number of inks and the lattice points for ink amount in the ink amount space, thereby acquiring correspondence between the lattice points in the low-dimensional color space and the lattice points in the device-independent color space;

prescribing a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement;

optimizing the arrangement of lattice points in the device-independent color-space by improving the rating of the smoothness evaluation function, with the lattice point position information in the low-dimensional color space varied; and referencing the original correspondence defining data, thereby associating the amount of each ink corresponding to the lattice points in the low-dimensional color space in the optimized state with the lattice points in the low-dimensional color space prescribed by the original correspondence defining data.

2. The method for determining lattice points to be referenced to prepare the correspondence defining data as defined in claim 1, wherein the smoothness evaluation function is a function which contains a term which is obtained by multiplying the formula expressing the magnitude of difference between the lattice point position information of the low-dimensional color space before variation and the lattice point position information of the low-dimensional color space after variation by a weighting factor which takes on a value which becomes larger as it departs from the middle point of the color component value of the low-dimensional color space.

3. The method for determining lattice points to be referenced to prepare the correspondence defining data as defined in claim 2, wherein the weighting factor increases relative to the color component value of the low-dimensional color space at a rate which becomes larger as the color component value of the low-dimensional color space departs from its middle point.

4. An apparatus for determining lattice points to be referenced to prepare correspondence defining data that defines correspondence between the amount of each ink used by the printing apparatus and the color component value in a color system, said apparatus comprising:

a unit to record the original correspondence defining data which previously prescribes correspondence between the lattice points in the low-dimensional color space prescribed by less color components than the number of inks and the lattice points for ink amount in the ink amount space;

a unit to acquire correspondence between the lattice points in the low-dimensional color space and the lattice points in the device-independent color space by referencing the original correspondence defining data;

a unit to calculate a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement;

a unit to optimize the arrangement of lattice points in the device-independent color-space by improving the rating of the smoothness evaluation function, with the lattice point position information in the low-dimensional color space varied; and a unit to reference the original correspondence defining data, thereby associating the amount of each ink corresponding to the lattice points in the low-dimensional color space in the optimized state with the lattice points in the low-dimensional color space prescribed by the original correspondence defining data.

5. A computer readable medium containing a program product which enables the computer to realize the capability of determining lattice points to be referenced to prepare correspondence defining data that defines correspondence between the amount of each ink used by the printing apparatus and the color component value in a color system, said program product comprising:

a feature to record in a prescribed recording medium the original correspondence defining data which previously prescribes correspondence between the lattice points in the low-dimensional color space prescribed by less color components than the number of inks and the lattice points for ink amount in the ink amount space and to acquire correspondence between the lattice points in the low-dimensional color space and the lattice points in the device-independent color space by referencing the original correspondence defining data;

a feature to calculate a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement;

a feature to optimize the arrangement of lattice points in the device-independent color-space by improving the rating of the smoothness evaluation function, with the lattice point position information in the low-dimensional color space varied; and a feature to reference the original correspondence defining data, thereby associating the amount of each ink corresponding to the lattice points in the low-dimensional color space in the optimized state with the lattice points in the low-dimensional color space prescribed by the original correspondence defining data.

6. A print controlling apparatus for generating the printing data which permit printing by referencing correspondence defining data that defines correspondence between the amount of each ink used by the printing apparatus and the color component value in a color system and converting the color component value in the color system into the amount of ink, which is characterized in that:

the correspondence defining data is one which is prepared by referencing the original correspondence defining data which previously prescribes correspondence between the lattice points in the low-dimensional color space prescribed by less color components than the number of inks and the lattice points for ink amount in the ink amount space, thereby acquiring correspondence between the lattice points in the low-dimensional color space and the lattice points in the device-independent color space, prescribing a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement, optimizing the arrangement of lattice points in the device-independent color-space by improving the rating of the smoothness evaluation function, with the lattice point position information in the low-dimensional color space varied, referencing the original correspondence defining data, thereby associating the amount of each ink corresponding to the lattice points in the low-dimensional color space in the optimized state with the lattice points in the low-dimensional color space prescribed by the original correspondence defining data to establish the lattice points for preparing the correspondence defining data, and associating the amount of ink with the color component value in the other color system by means of the colorimetric value measured by using a prescribed colorimetry for the result of printing with the amount of ink prescribed by the lattice points to be referenced to prepare the correspondence defining data.

7. A print controlling method for generating the printing data which permit printing by referencing correspondence defining data that defines correspondence between the amount of each ink used by the printing apparatus and the color component value in a color system and converting the color component value in the color system into the amount of ink, which is characterized in that:

the correspondence defining data is one which is prepared by referencing the original correspondence defining data which previously prescribes correspondence between the lattice points in the low-dimensional color space prescribed by less color components than the number of inks and the lattice points for ink amount in the ink amount space, thereby acquiring correspondence between the lattice points in the low-dimensional color space and the lattice points in the device-independent color space, prescribing a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement, optimizing the arrangement of lattice points in the device-independent color-space by improving the rating of the smoothness evaluation function, with the lattice point position information in the low-dimensional color space varied, referencing the original correspondence defining data, thereby associating the amount of each ink corresponding to the lattice points in the low-dimensional color space in the optimized state with the lattice points in the low-dimensional color space prescribed by the original correspondence defining data to establish the lattice points for preparing the correspondence defining data, and associating the amount of ink with the color component value in the other color system by means of the colorimetric value measured by using a prescribed colorimetry for the result of printing with the amount of ink prescribed by the lattice points to be referenced to prepare the correspondence defining data.

8. A computer readable medium containing a print controlling program product which enables the computer to realize the capability of generating the printing data which permit printing by referencing correspondence defining data that defines correspondence between the amount of each ink used by the printing apparatus and the color component value in a color system and converting the color component value in the color system into the amount of ink, which is characterized in that:

the correspondence defining data is one which is prepared by referencing the original correspondence defining data which previously prescribes correspondence between the lattice points in the low-dimensional color space prescribed by less color components than the number of inks and the lattice points for ink amount in the ink amount space, thereby acquiring correspondence between the lattice points in the low-dimensional color space and the lattice points in the device-independent color space, prescribing a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement, optimizing the arrangement of lattice points in the device-independent color-space by improving the rating of the smoothness evaluation function, with the lattice point position information in the low-dimensional color space varied, referencing the original correspondence defining data, thereby associating the amount of each ink corresponding to the lattice points in the low-dimensional color space in the optimized state with the lattice points in the low-dimensional color space prescribed by the original correspondence defining data to establish the lattice points for preparing the correspondence defining data, and associating the amount of ink with the color component value in the color system by means of the calorimetric value measured by using a prescribed colorimetry for the result of printing with the amount of ink prescribed by the lattice points to be referenced to prepare the correspondence defining data.

9. A color converting apparatus which references correspondence defining data that defines correspondence between the amount of each ink used by the printing apparatus and the color component value in a color system, thereby converting the color component value in the color system into the amount of ink, which is characterized in that:

the correspondence defining data is one which is prepared by referencing the original correspondence defining data which previously prescribes correspondence between the lattice points in the low-dimensional color space prescribed by less color components than the number of inks and the lattice points for ink amount in the ink amount space, thereby acquiring correspondence between the lattice points in the low-dimensional color space and the lattice points in the device-independent color space, prescribing a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement, optimizing the arrangement of lattice points in the device-independent color-space by improving the rating of the smoothness evaluation function, with the lattice point position information in the low-dimensional color space varied, referencing the original correspondence defining data, thereby associating the amount of each ink corresponding to the lattice points in the low-dimensional color space in the optimized state with the lattice points in the low-dimensional color space prescribed by the original correspondence defining data to establish the lattice points for preparing the correspondence defining data, and associating the amount of ink with the color component value in the other color system by means of the colorimetric value measured by using a prescribed colorimetry for the result of printing with the amount of ink prescribed by the lattice points to be referenced to prepare the correspondence defining data.

10. A color converting method which references correspondence defining data that defines correspondence between the amount of each ink used by the printing apparatus and the color component value in a color system, thereby converting the color component value in the color system into the amount of ink, which is characterized in that:

the correspondence defining data is one which is prepared by referencing the original correspondence defining data which previously prescribes correspondence between the lattice points in the low-dimensional color space prescribed by less color components than the number of inks and the lattice points for ink amount in the ink amount space, thereby acquiring correspondence between the lattice points in the low-dimensional color space and the lattice points in the device-independent color space, prescribing a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement, optimizing the arrangement of lattice points in the device-independent color-space by improving the rating of the smoothness evaluation function, with the lattice point position information in the low-dimensional color space varied, referencing the original correspondence defining data, thereby associating the amount of each ink corresponding to the lattice points in the low-dimensional color space in the optimized state with the lattice points in the low-dimensional color space prescribed by the original correspondence defining data to establish the lattice points for preparing the correspondence defining data, and associating the amount of ink with the color component value in the other color system by means of the colorimetric value measured by using a prescribed colorimetry for the result of printing with the amount of ink prescribed by the lattice points to be referenced to prepare the correspondence defining data.

11. A computer readable medium containing a color converting program product which references correspondence defining data that defines correspondence between the amount of each ink used by the printing apparatus and the color component value in a color system, thereby converting the color component value in the color system into the amount of ink, which is characterized in that:

the correspondence defining data is one which is prepared by referencing the original correspondence defining data which previously prescribes correspondence between the lattice points in the low-dimensional color space prescribed by less color components than the number of inks and the lattice points for ink amount in the ink amount space, thereby acquiring correspondence between the lattice points in the low-dimensional color space and the lattice points in the device-independent color space, prescribing a smoothness evaluation function which evaluates the smoothness of arrangement of lattice points in the device-independent color space by using as a variable the lattice point position information in the low-dimensional color space, said function having a function form differing depending on each region in the color gamut to which the lattice point to be evaluated belongs and also containing a constraint condition that the closer the lattice point is to the boundary of the region of the color gamut, the more the evaluated value decreases as the result of its movement, optimizing the arrangement of lattice points in the device-independent color-space by improving the rating of the smoothness evaluation function, with the lattice point position information in the low-dimensional color space varied, referencing the original correspondence defining data, thereby associating the amount of each ink corresponding to the lattice points in the low-dimensional color space in the optimized state with the lattice points in the low-dimensional color space prescribed by the original correspondence defining data to establish the lattice points for preparing the correspondence defining data, and associating the amount of ink with the color component value in the other color system by means of the colorimetric value measured by using a prescribed colorimetry for the result of printing with the amount of ink prescribed by the lattice points to be referenced to prepare the correspondence defining data.

* * * * *